United States Patent
Araki

(10) Patent No.: US 9,600,175 B2
(45) Date of Patent: Mar. 21, 2017

(54) METHOD AND SYSTEM FOR CLASSIFICATION SIGN DISPLAY

(75) Inventor: Sayaka Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 910 days.

(21) Appl. No.: 12/500,358

(22) Filed: Jul. 9, 2009

(65) Prior Publication Data

US 2010/0011315 A1    Jan. 14, 2010

Related U.S. Application Data

(60) Provisional application No. 61/080,552, filed on Jul. 14, 2008.

(51) Int. Cl.
G06F 3/0488 (2013.01)
G06F 3/0482 (2013.01)
G06F 3/0485 (2013.01)

(52) U.S. Cl.
CPC ........ G06F 3/04883 (2013.01); G06F 3/0482 (2013.01); G06F 3/0485 (2013.01)

(58) Field of Classification Search
CPC ... G06F 3/04883; G06F 3/0482; G06F 3/0485
USPC ................................. 715/786, 787
See application file for complete search history.

(56) References Cited

U.S. PATENT DOCUMENTS

| | | | | |
|---|---|---|---|---|
| 5,371,851 A | * | 12/1994 | Pieper et al. | 345/501 |
| 5,550,559 A | * | 8/1996 | Isensee et al. | 345/684 |
| 5,745,716 A | * | 4/1998 | Tchao et al. | 715/777 |
| 6,279,014 B1 | * | 8/2001 | Schilit | G06F 17/218 715/200 |
| 6,499,029 B1 | * | 12/2002 | Kurapati | G06F 17/30817 707/750 |
| 6,538,698 B1 | * | 3/2003 | Anderson | 348/333.05 |
| 6,593,943 B1 | * | 7/2003 | MacPhail | 715/734 |
| 6,957,233 B1 | * | 10/2005 | Beezer | G06F 17/241 |
| 7,765,568 B1 | * | 7/2010 | Gagnon et al. | 725/38 |
| 2002/0186252 A1 | * | 12/2002 | Himmel et al. | 345/787 |
| 2003/0008679 A1 | * | 1/2003 | Iwata et al. | 455/556 |
| 2003/0018632 A1 | * | 1/2003 | Bays | G06F 17/241 |
| 2003/0212544 A1 | * | 11/2003 | Acero | G06F 17/2785 704/9 |

(Continued)

FOREIGN PATENT DOCUMENTS

JP    2003-84882    3/2003

*Primary Examiner* — Amy M Levy
(74) *Attorney, Agent, or Firm* — Oblon, McClelland, Maier & Neustadt, L.L.P.

(57) ABSTRACT

An information processing apparatus includes: an operation accepting unit that accepts an instructing operation for displaying a list in which plural items classified on the basis of a predetermined rule are ordered on the basis of the predetermined rule; and a display control unit that causes a display unit to display a part of the list in accordance with the accepted instructing operation, and causes the display unit to display a classification sign display bar in which classification signs representing the predetermined rule for each classification are ordered on the basis of the predetermined rule, the display control unit controlling a display state of the classification sign display bar so that an area including classification signs corresponding to items of the plural items which are contained in the list displayed on the display unit, and an area including classification signs other than the classification signs are displayed in different modes.

17 Claims, 25 Drawing Sheets

(56) References Cited

U.S. PATENT DOCUMENTS

| | | | |
|---|---|---|---|
| 2005/0210403 A1* | 9/2005 | Satanek | 715/786 |
| 2005/0246640 A1* | 11/2005 | Lacy | 715/713 |
| 2006/0010396 A1* | 1/2006 | Beezer | G06F 17/241 715/802 |
| 2006/0020969 A1* | 1/2006 | Utsuki et al. | 725/39 |
| 2006/0161578 A1* | 7/2006 | Siegel | G06F 17/30038 |
| 2006/0184901 A1* | 8/2006 | Dietz | 715/855 |
| 2007/0118795 A1* | 5/2007 | Noyes | G06F 17/241 715/203 |
| 2007/0132789 A1* | 6/2007 | Ording et al. | 345/684 |
| 2007/0146337 A1* | 6/2007 | Ording et al. | 345/173 |
| 2007/0150830 A1* | 6/2007 | Ording et al. | 715/784 |
| 2007/0150867 A1* | 6/2007 | Barsness et al. | 717/124 |
| 2007/0169147 A1* | 7/2007 | Kii | 725/38 |
| 2008/0080837 A1* | 4/2008 | Mei et al. | 386/95 |
| 2008/0122796 A1* | 5/2008 | Jobs et al. | 345/173 |
| 2009/0044142 A1* | 2/2009 | Faris et al. | 715/780 |
| 2009/0144642 A1* | 6/2009 | Crystal | 715/764 |

\* cited by examiner

| CONTENT KIND | CONTENT IDENTIFICATION INFORMATION | TITLE | RELATED PERSON'S NAME | PURCHASE DATE | NOTES INFORMATION | COLLECTION INFORMATION | METADATA | THUMBNAIL |
|---|---|---|---|---|---|---|---|---|
| | 301 | 302 | 303 | 304 | 305 | 306 | 307 | 308 | 309 |
| BOOK CONTENT | #1001 | ... | ... | ... | ... | ... | ... | ▭ |
| | #1002 | ... | ... | ... | ... | ... | ... | ▭ |
| | #1003 | ... | ... | ... | ... | ... | ... | ▭ |
| | : | : | : | : | : | : | : | : |
| AUDIO CONTENT | #2001 | ... | ... | ... | ... | ... | ... | ▭ |
| | #2002 | ... | ... | ... | ... | ... | ... | ▭ |
| | : | : | : | : | : | : | : | : |
| STILL IMAGE CONTENT | #3001 | ... | ... | ... | ... | ... | ... | ▭ |
| | #3002 | ... | ... | ... | ... | ... | ... | ▭ |
| | : | : | : | : | : | : | : | : |
| MOVING IMAGE CONTENT | #4001 | ... | ... | ... | ... | ... | ... | ▭ |
| | #4002 | ... | ... | ... | ... | ... | ... | ▭ |
| | : | : | : | : | : | : | : | : |

FIG. 5

| LIST NUMBER | CONTENT IDENTIFICATION INFORMATION | TITLE | RELATED PERSON'S NAME | PAGE NUMBER | CLASSIFICATION CODE |
|---|---|---|---|---|---|
| 0 | #1005 | 142··· | Bob ··· | 1 | # |
| 1 | #1035 | 1715··· | Jim ··· | 1 | # |
| 2 | #1056 | Aa··· | Douglas ··· | 1 | A |
| 3 | #1078 | The Ab··· | David ··· | 1 | A |
| 4 | #1067 | Ac··· | Cindy ··· | 1 | A |
| 5 | #1093 | ah··· | Robert··· | 1 | A |
| 6 | #1074 | The ap··· | Fred ··· | 1 | A |
| 7 | #1089 | The az··· | Andrew··· | 1 | A |
| 8 | #1092 | Ba··· | Jason ··· | 1 | B |
| 9 | #1034 | Bba··· | Nora ··· | 1 | B |
| 10 | #1063 | Bg··· | Emily ··· | 2 | B |
| 11 | #1013 | The Bhk··· | Amy ··· | 2 | B |
| 12 | #1024 | The bp··· | Elmore ··· | 2 | B |
| 13 | #1025 | The bz··· | James ··· | 2 | B |
| 14 | #1065 | Cd··· | Sara ··· | 2 | C |
| 15 | #1075 | The cj··· | Tony ··· | 2 | C |
| 16 | #1045 | The cr··· | Joe ··· | 2 | C |
| 17 | #1058 | Dp··· | John ··· | 2 | D |
| 18 | #1017 | The ec··· | Stephen ··· | 2 | E |
| 19 | #1029 | Ek··· | Paul ··· | 3 | E |
| 20 | #1031 | The Ex··· | Judy ··· | 3 | E |
| 21 | #1036 | Ez··· | Wallance ··· | 3 | E |
| 22 | #1079 | Fa··· | Tomy ··· | 3 | F |
| ⋮ | ⋮ | ⋮ | ⋮ | ⋮ | ⋮ |
| 83 | #1027 | Zz··· | Charry ··· | 9 | Z |
| 84 | #1009 | ☆☆··· | Boby ··· | 9 | * |

| LIST NUMBER | CONTENT IDENTIFICATION INFORMATION | TITLE | RELATED PERSON'S NAME | PAGE NUMBER | CLASSI-FICATION CODE |
|---|---|---|---|---|---|
| 0 | #1005 | 142··· | ··· | 1 | # |
| 1 | #1035 | 1715··· | ··· | 1 | # |
| 2 | #1056 | Aa··· | ··· | 1 | A |
| 3 | #1078 | The Ab··· | ··· | 1 | A |
| 4 | #1067 | Ac··· | ··· | 1 | A |
| 5 | #1093 | ah··· | ··· | 1 | A |
| 6 | #1074 | The ap··· | ··· | 1 | A |
| 7 | #1089 | The az··· | ··· | 1 | A |
| 8 | #1092 | Ba··· | ··· | 1 | B |
| 9 | #1034 | Bba··· | ··· | 1 | B |
| 10 | #1063 | Bg··· | ··· | 2 | B |
| 11 | #1013 | The Bhk··· | ··· | 2 | B |
| 12 | #1024 | The bp··· | ··· | 2 | B |
| 13 | #1025 | The bz··· | ··· | 2 | B |
| 14 | #1065 | Cd··· | ··· | 2 | C |
| 15 | #1075 | The cj··· | ··· | 2 | C |
| 16 | #1045 | The cr··· | ··· | 2 | C |
| 17 | #1058 | Dp··· | ··· | 2 | D |
| 18 | #1017 | The ec··· | ··· | 2 | E |
| 19 | #1029 | Ek··· | ··· | 3 | E |
| 20 | #1031 | The Ex··· | ··· | 3 | E |
| 21 | #1036 | Ez··· | ··· | 3 | E |
| 22 | #1079 | Fa··· | ··· | 3 | F |
| ⋮ | ⋮ | ⋮ | ⋮ | ⋮ | ⋮ |
| 83 | #1027 | Zz··· | ··· | 9 | Z |
| 84 | #1009 | ☆☆··· | ··· | 9 | * |

(b)
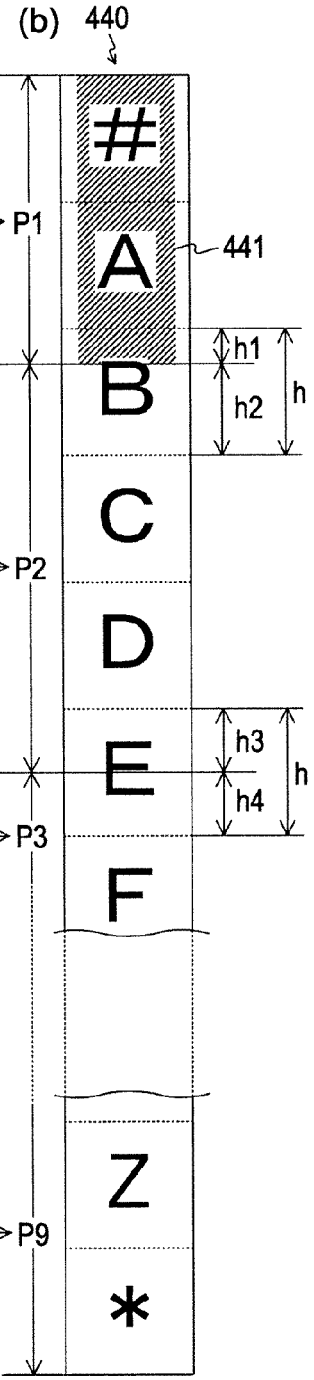

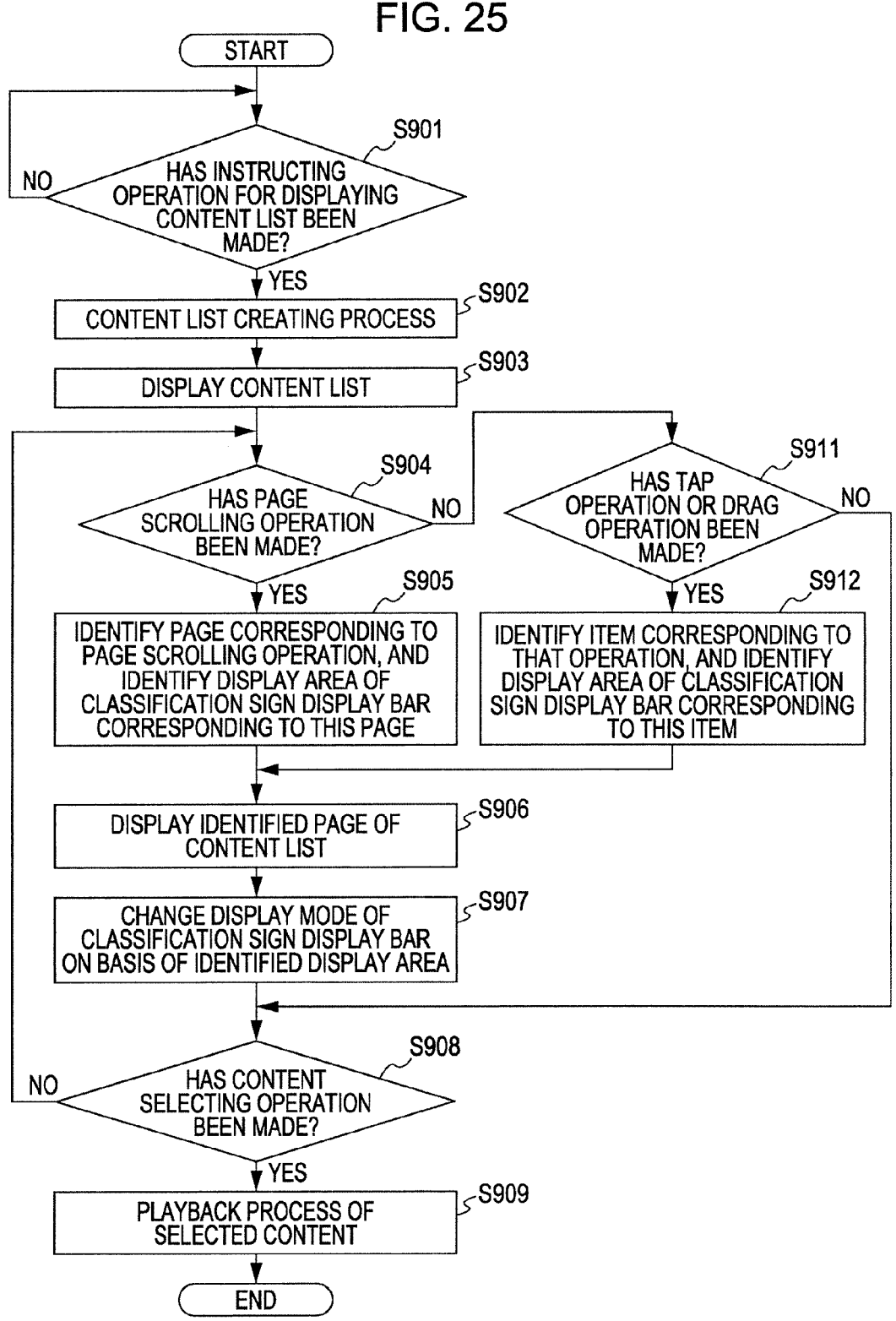

METHOD AND SYSTEM FOR CLASSIFICATION SIGN DISPLAY

BACKGROUND OF THE INVENTION

1. Field of the Invention

The present invention relates to an information processing apparatus, and more specifically to an information processing apparatus and a display control method for displaying an image, and a program for causing a computer to execute the display control method.

2. Description of the Related Art

In the related art, an information processing apparatus exists such as a portable electronic book reader which can store books such as novels as electronic data, and display books on the basis of this electronic data. Also, there has been proposed an information processing apparatus in which electronic data for a plurality of books is stored and which allows a desired book to be selected for display from among these plurality of books. In the case where a desired book is to be selected for display from among a plurality of books, for example, the titles of books corresponding to individual pieces of electronic data are arranged in a list, and a desired book can be selected for display from among the listed books. Moreover, there has been proposed an information processing apparatus with which, when there are a large number of books to be listed, for example, only a part of the listing is displayed, and the other part of the listing is displayed by a user's scroll operation.

For example, an information processing apparatus has been proposed with which, when a part of a list containing a plurality of items each representing content is displayed, individual items are moved vertically by performing a scroll operation to display an item corresponding to a desired content (see, for example, Japanese Unexamined Patent Application Publication No. 2003-84882 (FIG. 7)). When a scroll operation is performed in this information processing apparatus, a scrollbar moves vertically with the vertical movement of items.

SUMMARY OF THE INVENTION

According to the related art described above, the scrollbar moves vertically with the vertical movement of items through a scroll operation. Thus, the user can easily grasp the relative position of items included in the current display screen within the entire list.

Now, suppose a case in which a part of a list (for example, the titles of contents) ordered on the basis of a predetermined rule (for example, in dictionary order), and a scrollbar are displayed side by side. In this case, by looking at the position of the scrollbar, it is possible to check the position of items included in the current display screen within the entire list. In this regard, it is assumed that if, for example, the ratios of alphabets corresponding to items included in the current display screen can be also checked at the same time, the outline of the items included in the current display screen within the entire list can be grasped more easily.

It is desirable to make it possible to easily grasp the outline of items included in the current display screen within the whole of a list containing a plurality of items, in a case when a part of the list is displayed.

According to an embodiment of the present invention, there are provided an information processing apparatus, a display control method, and a computer to execute the display control method. The information processing apparatus includes: an operation accepting unit that accepts an instructing operation for displaying a list in which a plurality of items classified into classifications on the basis of a predetermined rule are ordered on the basis of the predetermined rule; and a display control unit that causes a display unit to display a part of the list in accordance with the accepted instructing operation, and also causes the display unit to display a classification sign display bar in which classification signs representing the predetermined rule for each of the classifications are ordered on the basis of the predetermined rule, the display control unit controlling a display state of the classification sign display bar so that an area including classification signs corresponding to items of the plurality of items which are contained in the list displayed on the display unit, and an area including classification signs other than the classification signs are displayed in different modes. Therefore, a part of the list and the classification sign display bar are displayed, and the display state of the classification sign display bar is controlled so that an area including classification signs corresponding to items contained in the list being displayed, and an area including classification signs other than the above classification signs are displayed in different modes.

In the above-mentioned embodiment of the present invention, if a classification sign corresponding to items contained in the list displayed on the display unit, and a classification sign corresponding to items contained in the list not displayed on the display unit are the same classification sign, the display control unit may change a display mode related to an area containing the same classification sign, on the basis of a ratio between items related to the same classification sign which are displayed on the display unit, and items related to the same classification sign which are not displayed on the display unit. Therefore, if a classification sign corresponding to items contained in the list being displayed, and a classification sign corresponding to items contained in the list not being displayed are the same, the display mode related to the area including the classification sign is changed on the basis of the ratio between items related to the classification sign being displayed, and items related to the classification sign not being displayed.

In the above-mentioned embodiment of the present invention, the display control unit may control a display state of the classification sign display bar so that a rectangular area including classification signs corresponding to items contained in the list displayed on the display unit, and the other area are displayed in different modes on the classification sign display bar. Therefore, the display state of the classifications sign display bar is controlled so that a rectangular area including classification signs corresponding to items contained in the list displayed on the display unit, and the other area are displayed in different modes on the classification sign display bar.

In the above-mentioned embodiment of the present invention, the display control unit may control a display state of the classification sign display bar so that an area including two classification signs corresponding to an item located at one end of and an item located at the other end of items contained in the list displayed on the display unit, and classification signs existing between the two classification signs is displayed in the same mode. Therefore, the display state of the classifications sign display bar is controlled so that an area including two classification signs corresponding to an item located at one end of and an item located at the other end of items contained in the list being displayed, and classification signs existing between the two classification signs is displayed in the same mode.

In the above-mentioned embodiment of the present invention, the display control unit may control a display state of the classification sign display bar so that classification signs corresponding to items contained in the list and classification signs corresponding to items not contained in the list are displayed in different modes. Therefore, the display state of the classifications sign display bar is controlled so that classification signs corresponding to items contained in the list and classification signs corresponding to items not contained in the list are displayed in different modes.

In the above-mentioned embodiment of the present invention, the operation accepting unit may accept a change operation of changing items contained in the list displayed on the display unit, when a part of the list and the classification sign display bar are displayed on the display unit, and the display control unit may change and display items contained in the list displayed on the display unit, in accordance with the accepted change operation, and control a display state of the classification sign display bar so that an area including classification signs corresponding to items contained in the list displayed on the display unit after the change, and an area including classification signs other than the classification signs are displayed in different modes. Therefore, when a change operation of changing items contained in the list being displayed is accepted, items contained in the list being displayed are changed and displayed in accordance with this change operation, and the display state of the classification sign display bar is controlled so that an area including classification signs corresponding to items contained in the list displayed after the change, and an area including classification signs other than the above classification signs are displayed in different modes.

In the above-mentioned embodiment of the present invention, the display control unit may arrange and order the classification signs on the classification sign display bar in the same direction as a direction of movement of items contained in the list which are changed in accordance with the accepted change operation. Therefore, classification signs on the classification sign display bar are arranged and ordered in the same direction as the direction of movement of items contained in the list which are changed in accordance with the accepted change operation.

In the above-mentioned embodiment of the present invention, the operation accepting unit may accept, as the change operation, an operation of changing items contained in the list on a page-by-page basis, and the display control unit may change and display items contained in the list displayed on the display unit, on a page-by-page basis in accordance with the accepted change operation. Therefore, when a change operation of changing items contained in a list on an page-by-page basis is accepted, in accordance with this change operation, items contained in the list being displayed are changed and displayed on a page-by-page basis.

In the above-mentioned embodiment of the present invention, the operation accepting unit may accept, as the change operation, an operation of changing items contained in the list on an item-by-item basis, and the display control unit may change and display items contained in the list displayed on the display unit, on an item-by-item basis in accordance with the accepted change operation. Therefore, when a change operation of changing items contained in a list on an item-by-item basis is accepted, in accordance with this change operation, items contained in the list being displayed are changed and displayed on an item-by-item basis.

In the above-mentioned embodiment of the present invention, the operation accepting unit may accept, as the change operation, an operation of changing a display mode on the classification sign display bar, and the display control unit may cause the display unit to display a part of the list containing items corresponding to a classification sign identified in accordance with the accepted change operation. Therefore, when a change operation of changing a display mode on the classification sign display bar is accepted, a part of the list containing items corresponding to a classification sign identified in accordance with this change operation is displayed.

In the above-mentioned embodiment of the present invention, the operation accepting unit may accept, as the change operation, a selecting operation of selecting a desired classification sign on the classification sign display bar, and the display control unit may cause the display unit to display a part of the list containing items corresponding to the selected classification sign. Therefore, when a selecting operation of selecting a desired classification sign on the classification sign display bar is accepted, a part of the list containing items corresponding to the selected classification sign is displayed.

In the above-mentioned embodiment of the present invention, the operation accepting unit may be a touch panel that detects an object in proximity to or touching the classification sign display bar, and accept an operation input based on the detected proximity or touching as the change operation, and the display control unit may cause the display unit to display a part of the list containing items corresponding to a classification sign identified in accordance with the accepted change operation. Therefore, when an object in proximity to or touching the classification sign display bar is detected, and an operation input based on the detected proximity or touching is accepted, a part of the list containing items corresponding to a classification sign identified in accordance with this operation input is displayed.

In the above-mentioned embodiment of the present invention, the display control unit may cause the display unit to display the list containing the items each including at least one of a letter, a numeral, a symbol, and an image representing content, the operation accepting unit may accept a selecting operation of selecting an item contained in the list displayed on the display unit, and the information processing apparatus may further include a content playback unit that plays back content corresponding to the item selected in accordance with the accepted selecting operation. Therefore, when a selecting operation of selecting an item contained in the list being displayed is accepted, content corresponding to the selected item is played back.

BRIEF DESCRIPTION OF THE DRAWINGS

FIG. 4 is a diagram schematically showing information stored in a content management information storing unit according to the first embodiment of the present invention;

FIG. 5 is a diagram schematically showing a content list that is created by a content list creating unit and held in a content list holding unit according to the first embodiment of the present invention;

FIG. 7 is a diagram schematically showing the relationship between a content list held in the content list holding unit, and a classification-sign-display-bar display area according to the first embodiment of the present invention;

FIG. 25 is a flowchart showing the procedure of a content playback process with the information processing apparatus according to the second embodiment of the present invention.

DESCRIPTION OF THE PREFERRED EMBODIMENTS

Modes for carrying out the present invention (hereinafter, referred to as embodiments) will be described below. The description will be given in the following order.

1. First Embodiment (content list display control: example in which a content list ordered on the basis of a predetermined rule is scrolled page by page and displayed)

2. Second Embodiment (content list display control: example in which a content list ordered on the basis of a predetermined rule is scrolled item by item and displayed)

1. First Embodiment

[Exterior Configuration Example of Information Processing Apparatus]

Figure 1:
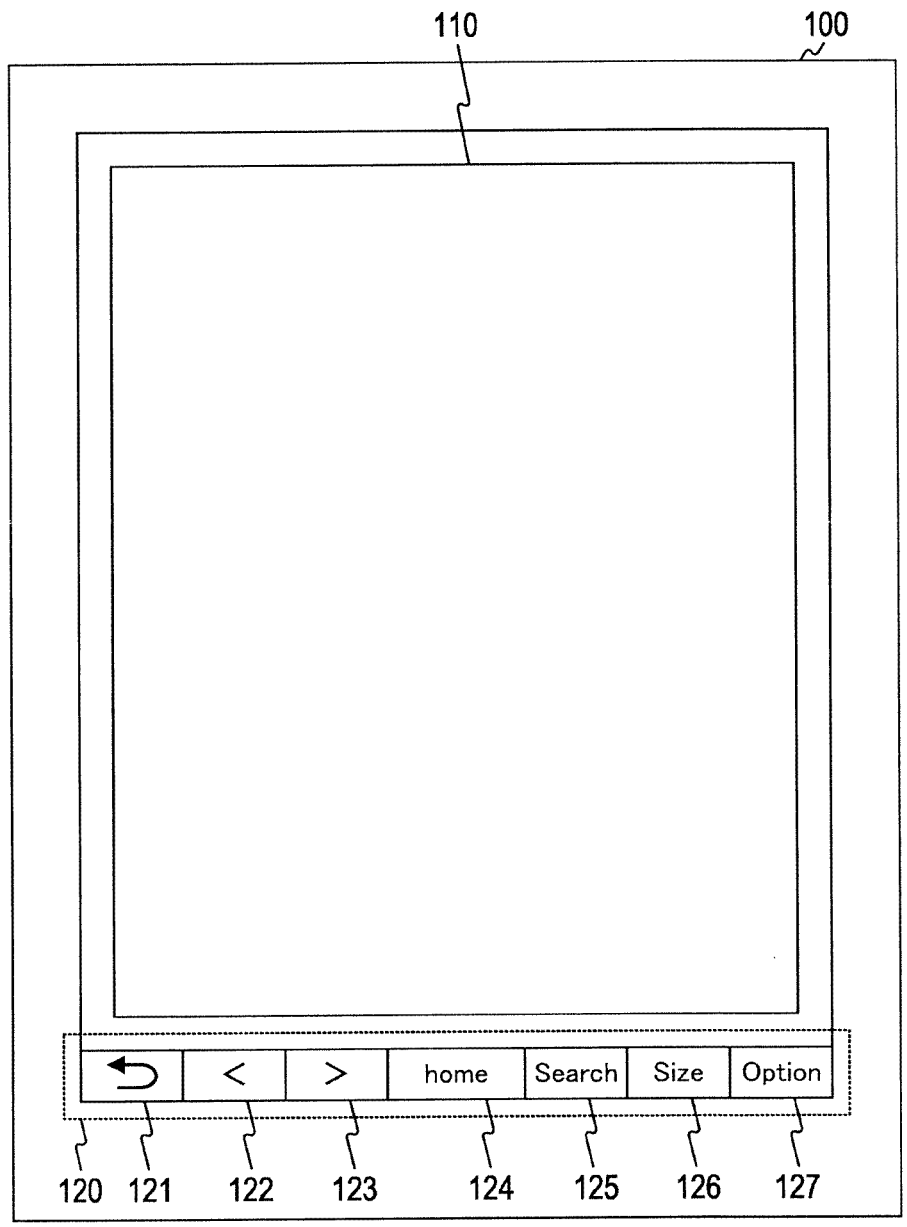
FIG. 1 is a diagram showing the exterior appearance of an information processing apparatus according to a first embodiment of the present invention.

FIG. 1 is a diagram showing the exterior appearance of an information processing apparatus 100 according to a first embodiment of the present invention. In FIG. 1, for ease of description, the information processing apparatus 100 is depicted in a simplified manner, by omitting illustration of operating members such as a power switch and an output terminal provided in the outer surface of the information processing apparatus 100. The information processing apparatus 100 includes an input/output panel 110 and an operating unit 120. The information processing apparatus 100 is realized by, for example, an information processing apparatus such as a portable electronic book reader which can display book content.

The input/output panel 110 displays various kinds of image, and also accepts an operation input from the user by detecting a touch operation on the input/output panel 110.

The operating unit 120 accepts an operation input made by the user, and includes a return button 121, page scrolling buttons 122 and 123, a home button 124, a search button 125, a size button 126, and an option button 127.

The return button 121 is depressed to return a screen displayed on the input/output panel 110 to a predetermined screen. For example, in a case where screens transition in a multi-level structure, when the return button 121 is depressed, a screen one level above the screen being displayed on the input/output panel 110 is displayed.

The page scrolling buttons 122 and 123 are depressed to change the contents of a screen displayed on the input/output panel 110 on a page-by-page basis. For example, when the page scrolling button 122 is depressed, the contents of the screen displayed on the input/output panel 110 are changed so as to return by one page. When the page scrolling button 123 is depressed, the contents of the screen displayed on the input/output panel 110 are changed so as to advance by one page.

Figure 9:
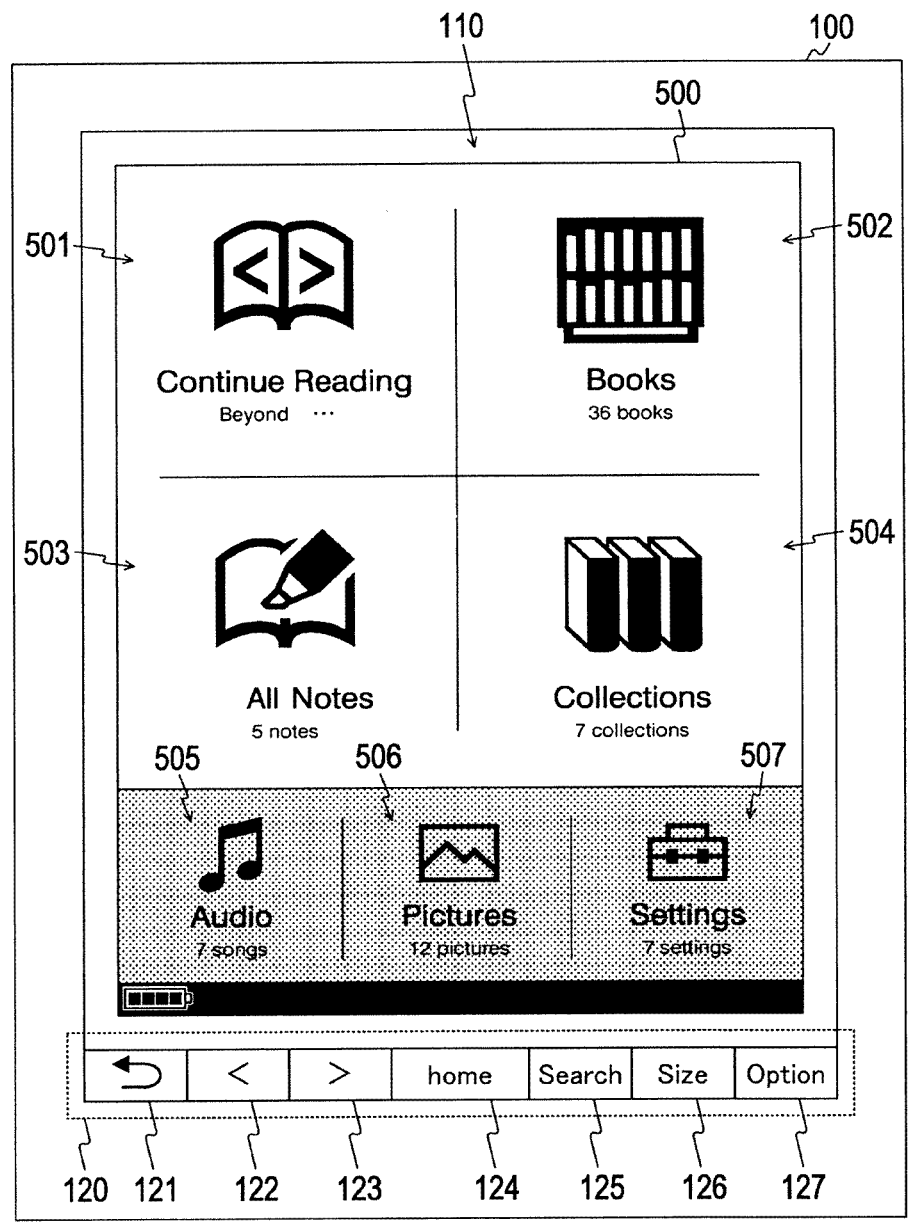
FIG. 9 is a diagram showing a display example of a home screen displayed on the input/output panel according to the first embodiment of the present invention.

The home button 124 is depressed to display the top-level screen (for example, a home screen 500 shown in FIG. 9). This top-level screen will be described later with reference to FIG. 9.

The search button 125 is depressed to display a search screen for performing various searches related to a screen displayed on the input/output panel 110. For example, when the search button 125 is depressed, on the screen displayed on the input/output panel 110, a search screen related to this screen is displayed in an overlapping manner.

The size button 126 is depressed to display a size change screen for changing the size of letters or the like on a screen displayed on the input/output panel 110. For example, when the size button 126 is depressed, on the screen displayed on the input/output panel 110, a size change screen related to this screen is displayed in an overlapping manner.

The option button 127 is depressed to display an option screen for setting each function related to a screen displayed on the input/output panel 110. For example, when the option button 127 is depressed, on the screen displayed on the input/output panel 110, an option screen related to this screen is displayed in an overlapping manner. This option screen will be described later with reference to FIG. 13.

[Internal Configuration Example of Information Processing Apparatus]

Figure 2:
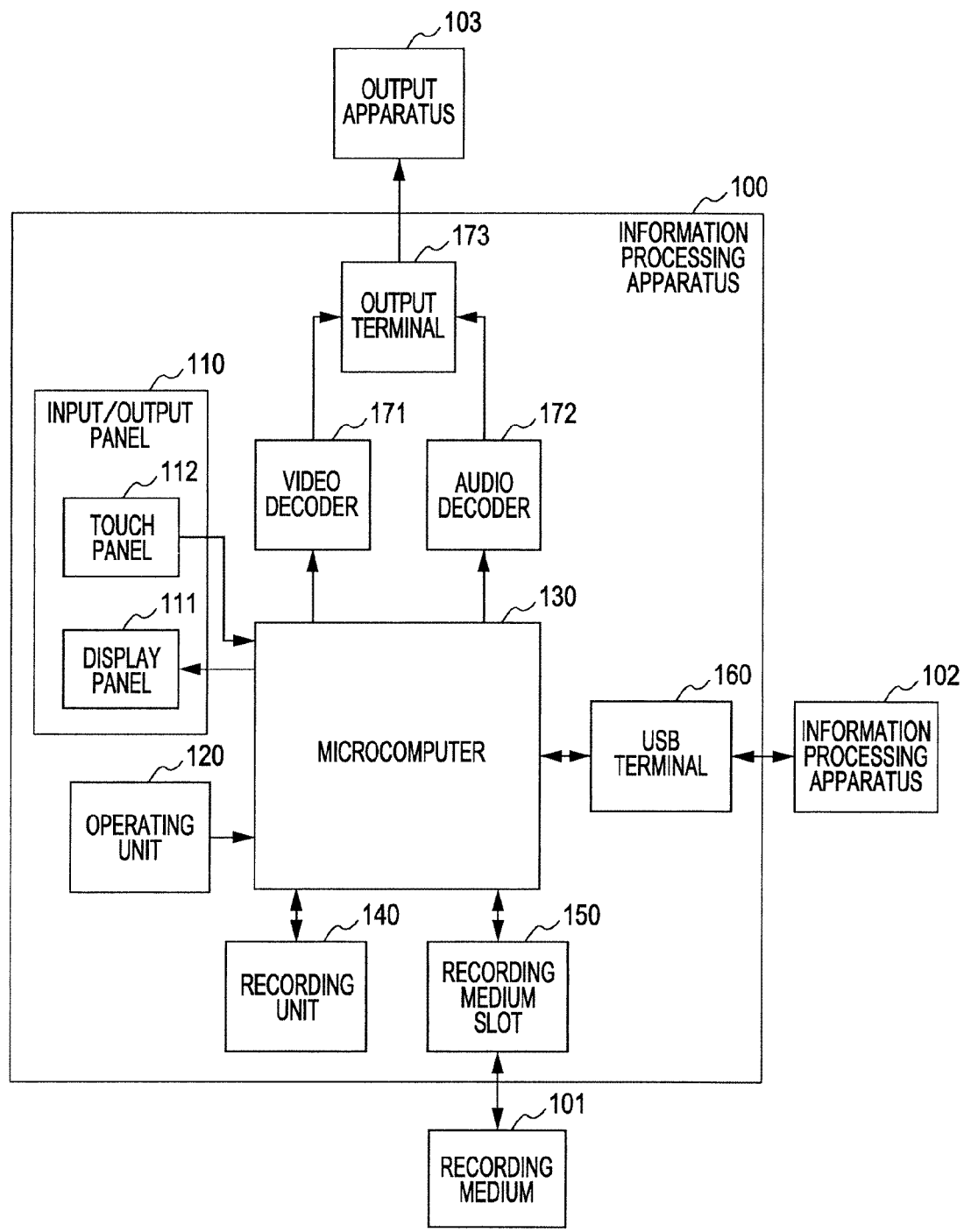
FIG. 2 is a block diagram showing an internal configuration example of the information processing apparatus according to the first embodiment of the present invention.

FIG. 2 is a block diagram showing an internal configuration example of the information processing apparatus 100 according to the first embodiment of the present invention. The information processing apparatus 100 includes the input/output panel 110, the operating unit 120, a microcomputer 130, a recording unit 140, a recording medium slot 150, and a USB (Universal Serial Bus) terminal 160. In addition, the information processing apparatus 100 includes a video decoder 171, an audio decoder 172, and an output terminal 173. Since the input/output panel 110 and the operating unit 120 are the same as those shown in FIG. 1, the input/output panel 110 and the operating unit 120 are denoted by the same reference numerals in the following description.

The input/output panel 110 includes a display panel 111 and a touch panel 112. On the basis of an image signal supplied from the microcomputer 130, the display panel 111 displays an image corresponding to the image signal. As the display panel 111, for example, electronic paper, an LCD (Liquid Crystal Display) panel, an organic EL (Electro Luminescence) panel, or the like can be used. The touch panel 112 is placed over the display panel 111 in an overlapping manner so that the screen of the display panel 111 can be seen through the touch panel 112, and accepts an operation input from the user by detecting an object touching its display surface. Upon accepting a user's operation input on an operating button or the like on an operation screen displayed on the display panel 111, the touch panel 112 outputs an operation signal corresponding to the operation position to the microcomputer 130. As the touch panel 112, for example, a type of touch panel can be used which converts a touch on the display surface into an electrical signal by using a dedicated detector, and outputs this converted electrical signal to the microcomputer 130. As the touch panel 112, for example, it is also possible to use an optical sensor-type touch panel which can detect an object that is in close proximity to or touching the display surface.

The operating unit 120 accepts an operation made by the user, and outputs a control signal corresponding to the accepted operation to the microcomputer 130.

The microcomputer 130 includes a CPU (Central Processing Unit) and a memory, and executes a control program stored in this memory. That is, the microcomputer 130 performs centralized control of the information processing apparatus 100. The memory included in the microcomputer 130 is a memory such as a ROM (Read Only Memory) or a RAM (Random Access Memory). An example of functional configuration realized by the microcomputer 130 will be described later in detail with reference to FIG. 3.

The recording unit 140 records data supplied from the microcomputer 130, and supplies recorded data to the microcomputer 130. The recording unit 140 stores, for example, contents (files) such as book content, music content, still image content, and moving image content. In addition, the recording unit 140 stores, for example, content management information for managing each content. As the recording unit 140, for example, a drive for a recording medium such as a magnetic tape or an optical disc, an HDD (Hard Disk Drive), or the like can be used.

The recording medium slot 150 is used for connecting a recording medium 101 to the information processing apparatus 100, and allows input and output of various kinds of information to and from the recording medium 101. The recording medium 101 is a recording device in which data supplied via the recording medium slot 150 is recorded, and supplies recorded data to the microcomputer 130 via the recording medium slot 150. As the recording medium 101, for example, various kinds of memory card can be used.

The USB terminal 160 is an interface for connecting between the information processing apparatus 100 and an information processing apparatus 102 (for example, a personal computer). The USB terminal 160 allows transmission and reception of various kinds of information to and from the information processing apparatus 102. For example, content is read from the information processing apparatus 102 connected to the USB terminal 160, and the read content is recorded into the recording unit 140. Also, content is outputted to the information processing apparatus 102 connected to the USB terminal 160.

The video decoder 171 decodes image data such as video data by a predetermined decoding scheme, and outputs the decoded image data to the output terminal 173.

The audio decoder 172 decodes music data by a predetermined decoding scheme, and outputs the decoded music data to the output terminal 173.

The output terminal 173 outputs image data outputted from the video decoder 171, and music data outputted from the audio decoder 172 to an external apparatus (for example, an output apparatus 103) other than the information processing apparatus 100. The output apparatus 103 outputs content outputted from the information processing apparatus 100, and is realized by, for example, an audio-visual apparatus such as a television that outputs moving images and sound.

[Functional Configuration Example of Information Processing Apparatus]

Figure 3:
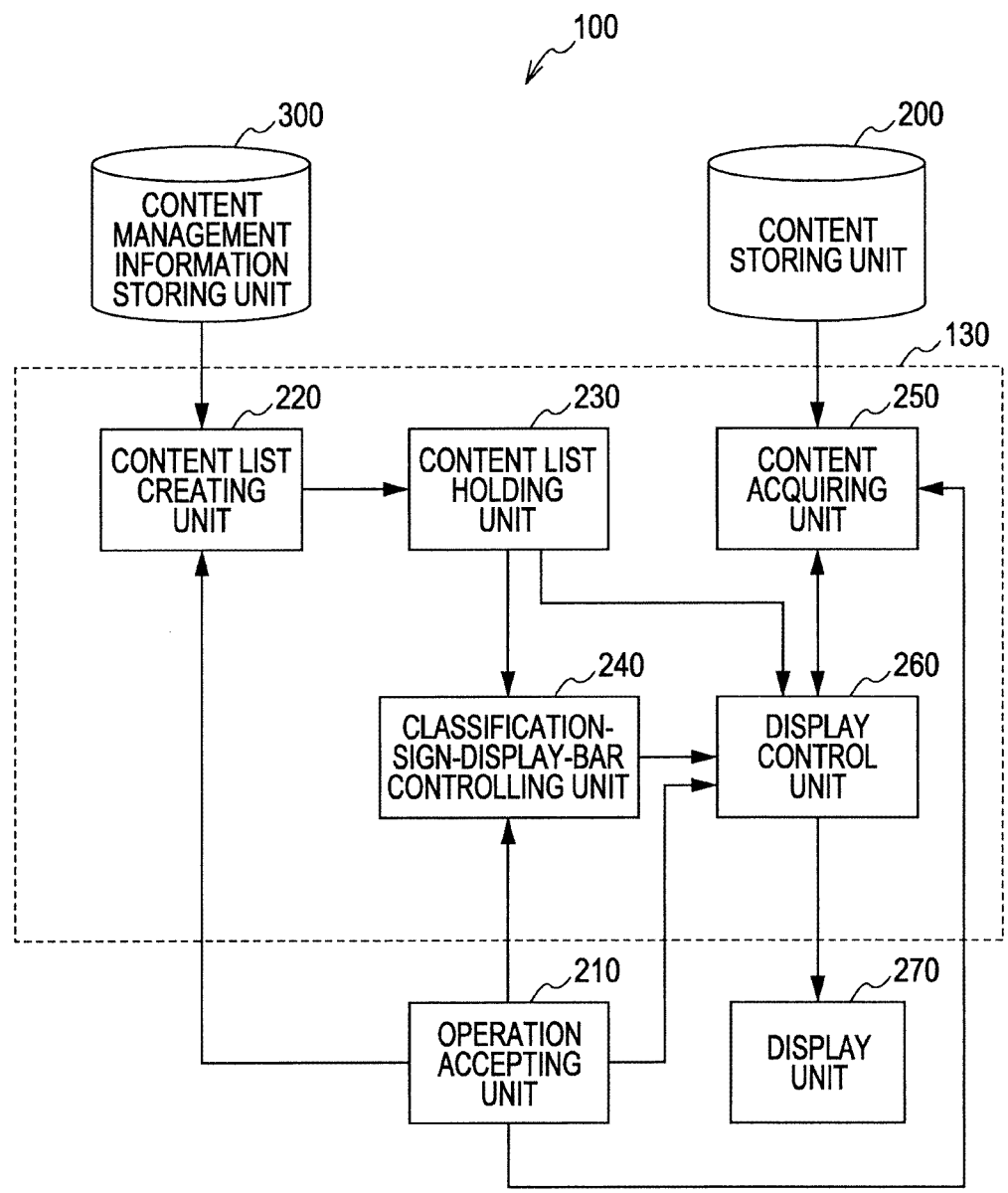
FIG. 3 is a block diagram showing a functional configuration example of the information processing apparatus according to the first embodiment of the present invention.

FIG. 3 is a block diagram showing a functional configuration example of the information processing apparatus 100 according to the first embodiment of the present invention. The information processing apparatus 100 includes a content storing unit 200, an operation accepting unit 210, a content list creating unit 220, a content list holding unit 230, and a classification-sign-display-bar controlling unit 240. In addition, the information processing apparatus 100 includes a content acquiring unit 250, a display control unit 260, a display unit 270, and a content management information storing unit 300. The content list creating unit 220, the content list holding unit 230, the classification-sign-display-bar controlling unit 240, the content acquiring unit 250, and the display control unit 260 correspond to the microcomputer 130 shown in FIG. 2.

The content storing unit 200 stores contents such as book content, music content, still image content, and moving image content, and supplies each stored content to the content acquiring unit 250. The content storing unit 200 corresponds to the recording unit 140 or the recording medium 101 shown in FIG. 2.

The content management information storing unit 300 stores, for individual contents, content management information for managing content stored in the content storing unit 200, in association with each content. In addition, the content management information storing unit 300 supplies stored content management information to the content list creating unit 220. Information stored in the content management information storing unit 300 will be described later in detail with reference to FIG. 4. The content management information storing unit 300 corresponds to the recording unit 140 or the recording medium 101 shown in FIG. 2.

The operation accepting unit 210 accepts an operation input from the user, and outputs operation information corresponding to the accepted operation input to the content list creating unit 220, the classification-sign-display-bar controlling unit 240, the content acquiring unit 250, and the display control unit 260. The operation accepting unit 210 corresponds to the input/output panel 110 and the operating unit 120 shown in FIG. 2.

The content list creating unit 220 creates a list of contents (content list) stored in the content storing unit 200, in accordance with an operation input accepted by the operation accepting unit 210. Then, the content list creating unit 220 causes the created content list to be held by the content list holding unit 230. Specifically, in accordance with an operation input accepted by the operation accepting unit 210, the content list creating unit 220 creates a content list on the basis of content management information stored in the content management information storing unit 300. This content list creation will be described later in detail with reference to FIG. 5.

The content list holding unit 230 holds a content list created by the content list creating unit 220, and outputs the held content list to the classification-sign-display-bar controlling unit 240 and the display control unit 260. The contents of information held at this time will be described later in detail with reference to FIG. 5.

The classification-sign-display-bar controlling unit 240 identifies an area where the display mode is to be changed on a classification sign display bar displayed in the display unit 270, in accordance with an operation input accepted by the operation accepting unit 210. Then, the classification-sign-display-bar controlling unit 240 outputs area information related to the identified area to the display control unit 260. When a page scrolling operation on the classification sign display bar is performed, the classification-sign-display-bar controlling unit 240 identifies a page corresponding to the page scrolling operation. Then, the classification-sign-display-bar controlling unit 240 outputs page information related to the identified page to the display control unit 260. The display mode and page scrolling operation on the classification sign display bar mentioned above will be described later in detail with reference to FIGS. 6 and 7.

The content acquiring unit 250 acquires content stored in the content storing unit 200 in accordance with an operation input accepted by the operation accepting unit 210, and outputs the acquired content to the display control unit 260. For example, upon acceptance of a selecting operation of selecting desired content on a content list screen displayed on the display unit 270, the content acquiring unit 250 acquires the selected content from the content storing unit 200. In this case, the layout of a content list included in the content list screen is determined by content list display information outputted from the display control unit 260.

The display control unit 260 displays various kinds of image on the display unit 270 in accordance with an operation input accepted by the operation accepting unit 210. For example, the display control unit 260 displays on the display unit 270 a content list held in the content list holding unit 230 or content acquired by the content acquiring unit 250. In addition, the display control unit 260 changes the display mode on the classification sign display bar on the basis of area information outputted from the classification-sign-display-bar controlling unit 240. Also, the display control unit 260 changes the display state of a content list on the basis of page information outputted from the classification-sign-display-bar controlling unit 240. Information on the layout of a content list included in the content list screen is outputted to the content acquiring unit 250. These display examples will be described later in detail with reference to FIGS. 6, 9, and the like. The display control unit 260 is an example of a content playback unit described in the claims.

The display unit 270 displays various kinds of image on the basis of control by the display control unit 260. The display unit 270 corresponds to the display panel ill shown in FIG. 2.

[Configuration Example of Content Management Information]

FIG. 4 is a diagram schematically showing information stored in the content management information storing unit 300 according to the first embodiment of the present invention. In the content management information storing unit 300, management information on each content is stored while being classified by Content Kind 301. In the content management information storing unit 300, Content Identification Information 302, Title 303, Related Person's Name 304, Purchase Date 305, Notes Information 306, Collection Information 307, Metadata 308, and Thumbnail 309 are stored.

In the Content Identification Information 302, identification information for identifying each content is stored. For example, "#1001" to "#1003" and the like are stored as content identification information related to book content.

In the Title 303, letters indicating a title assigned to each content are stored. For example, in the case of book content, its title is stored. In the case of music content, its song title is stored.

In the Related Person's Name 304, letters indicating the name of a person related to each content are stored. For example, in the case of book content, the name of its author is stored. In the case of music content, the name of a singer who sings the song is stored.

In the Purchase Date 305, the date and time when each content is purchased and recorded into the content storing unit 200 are stored. For example, in a case where content is purchased via the Internet, the date of the purchase is stored in the Purchase Date 305.

In the Notes Information 306, notes information added to each content by the user is stored. The notes information includes information related to, for example, a Bookmark added to each page in the text of book content by a user operation, a Highlight used to mark an arbitrary word (paragraph) in the text of book content to emphasize the portion, and the like. Each piece of notes information can be given a name (notes name) for identification. These pieces of notes information are managed for individual book contents, and the pieces of notes information managed for individual book contents can be displayed as a content list. In addition, it is also possible to display pieces of notes information for all book contents as a content list. A content list of notes information will be described later in detail with reference to FIGS. 18 and 19.

Figure 16:
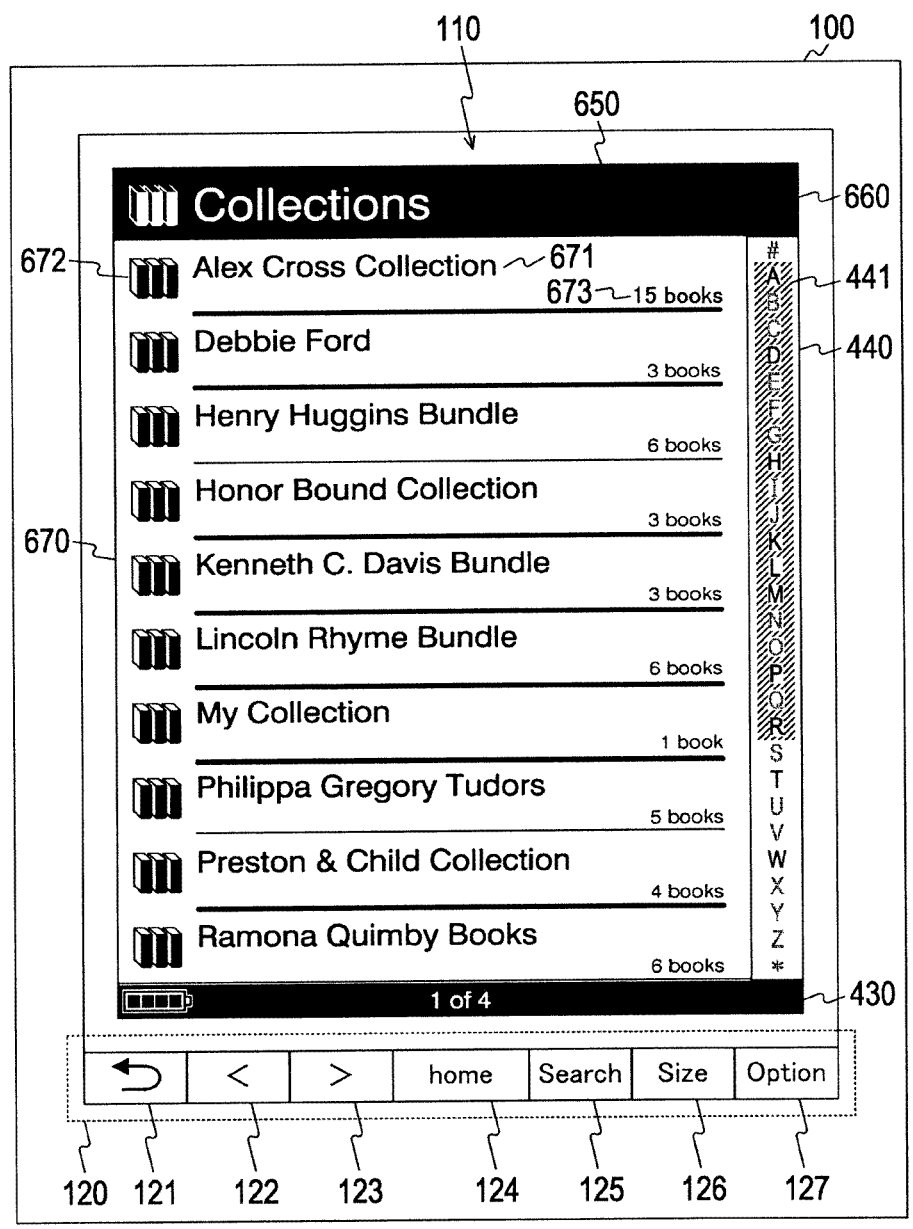
FIG. 16 is a diagram showing a display example of a content list screen on the input/output panel according to the first embodiment of the present invention.
Figure 17:
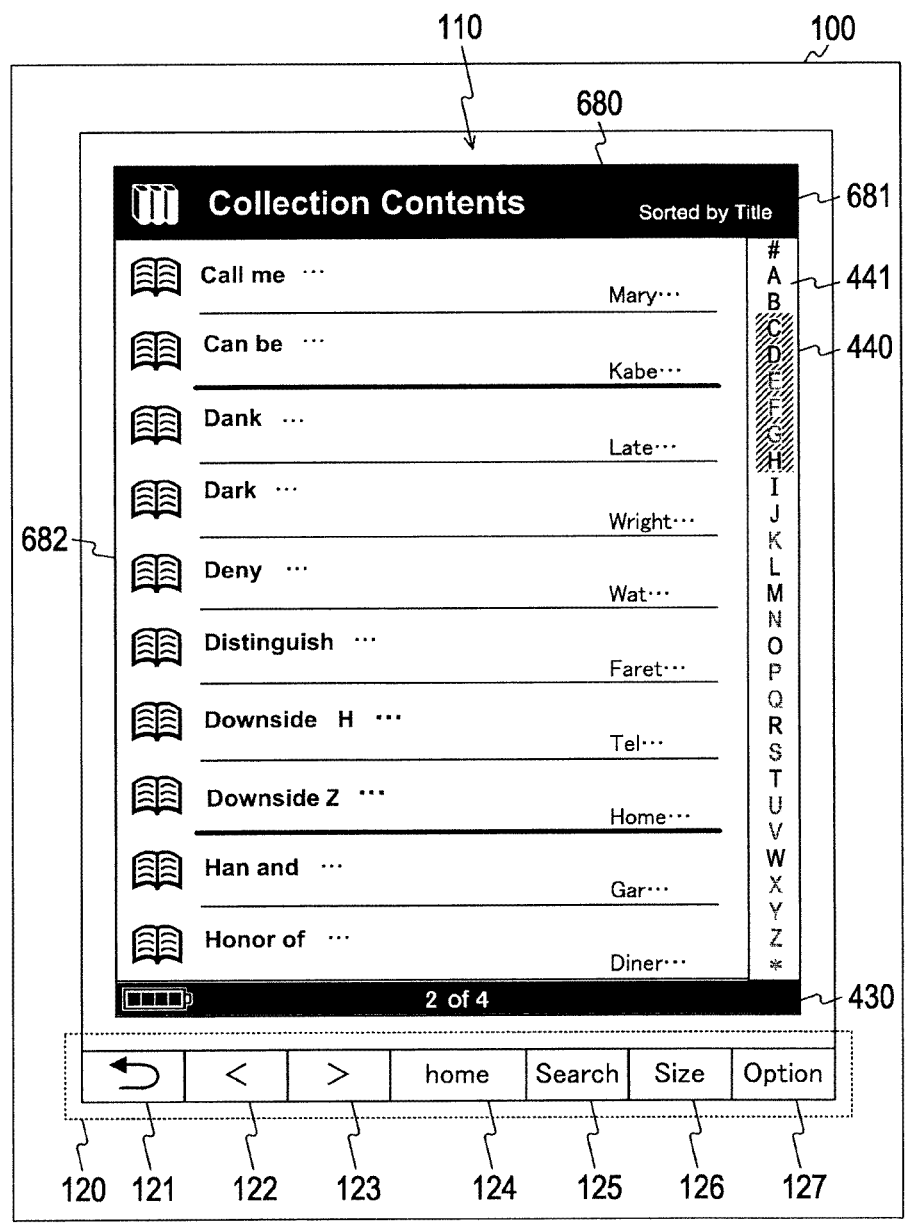
FIG. 17 is a diagram showing a display example of a content list screen on the input/output panel according to the first embodiment of the present invention.

In the Collection Information 307, information related to a collection (collection information) generated by the user is stored. A collection is, for example, a save location for classifying book content, and equivalent to a folder. For example, through a user's manual operation, a plurality of books can be combined into a single collection and managed. A name (collection name) for identification can be given to each collection. A content list using collection information is shown in FIGS. 16 and 17.

In the Metadata 308, metadata related to each content is stored. For example, if the corresponding content is a rented content, expiry date information or the like related to the rental is stored.

In the Thumbnail 309, a thumbnail related to each content is stored. For example, in the case of book content, the same image as that of the front cover of the book is stored as a thumbnail. In the case of music content, the same image as that of its jacket is stored as a thumbnail.

While the first embodiment of the present invention is directed to the case in which content management information is stored in the content management information storing unit 300 for use, it is also possible, for example, to record content management information in each content file for use.

[Creation Example of Content List]

FIG. 5 is a diagram schematically showing a content list that is created by the content list creating unit 220 and held in the content list holding unit 230 according to the first embodiment of the present invention. In this example, the description will be directed to a case in which, among contents stored in the content storing unit 200, display of a content list of book contents is selected. Also, in this example, a content list is created on the basis of the titles of a book contents.

In accordance with an operation input accepted by the operation accepting unit 210, the content list creating unit 220 creates a list of contents stored in the content storing unit 200, on the basis of content management information stored in the content management information storing unit 300. For example, a description will be given of a case in which the operation accepting unit 210 has accepted a selecting operation for creating a content list of book contents by ordering their titles in dictionary order (so-called alphabetical order). In this case, for example, the content list creating unit 220 acquires content management information associated with book contents, from among pieces of content management information stored in the content management information storing unit 300. Subsequently, the content list creating unit 220 orders (sorts) individual contents in dictionary order on the basis of the Title 303 (shown in FIG. 4) in the acquired content management information. In this case, for example, the titles of individual contents are ordered from A to Z. It should be noted that on the basis of library rules, if the word at the beginning of a title is "the", then the title is ordered by using the word the follows "the". In addition, a content whose title begins with a numeral is ordered before "A". In addition, a content whose title begins with a symbol (for example, ★) other than a numeral or an alphabet is ordered after "Z". FIG. 5 shows an example of a content list created in this way. In the example shown in FIG. 5, some of the items from "F" to "Z" are omitted.

The content list holding unit 230 holds, for example, List Number 231, Content Identification Information 232, Title 233, Related Person's Name 234, Page Number 235, and Classification Code 236.

The List Number 231 is a number indicating the order of each item contained in a content list created by the content list creating unit 220.

The Content Identification Information 232 is content identification information of content corresponding to each item contained in a content list created by the content list creating unit 220.

The Title 233 is the title of content corresponding to each item contained in a content list created by the content list creating unit 220.

The Related Person's Name 234 is the name of a person related to content corresponding to each item contained in a content list created by the content list creating unit 220. The Content Identification Information 232, the Title 233, and the Related Person's Name 234 are the same as those stored in the content management information storing unit 300.

The Page Number 235 is a number that indicates a page to which each item contained in a content list corresponds, when displaying the content list while moving the content list page by page on a content list screen on the display unit 270. For example, when 10 contents are to be displayed per page on the content list screen, the page number is added up every 10 contents and recorded in the Page Number 235. On the basis of the Page Number 235, it is possible to determine to which page each item contained in a content list belongs.

The Classification Code 236 is a code indicating a group into which each item contained in a content list created by the content list creating unit 220 is classified. For example, when ordering individual contents in dictionary order on the basis of the titles of the contents, each classification code is stored on the basis of the first letter of the first word of the title of each content (when the first word is "The", the first letter of the word following the first word). That is, on the basis of the first letter of the first word of the title of each content, each content is classified into one of #, A to Z, and *, and each classification code is stored in accordance with this classification.

As for the letters of each title and related person's name shown according to an embodiment of the present invention, only the numerals or letters at the beginning are shown, and the other numerals or letters are omitted as " . . . ".

[Display Example of Content List]

Figure 6:
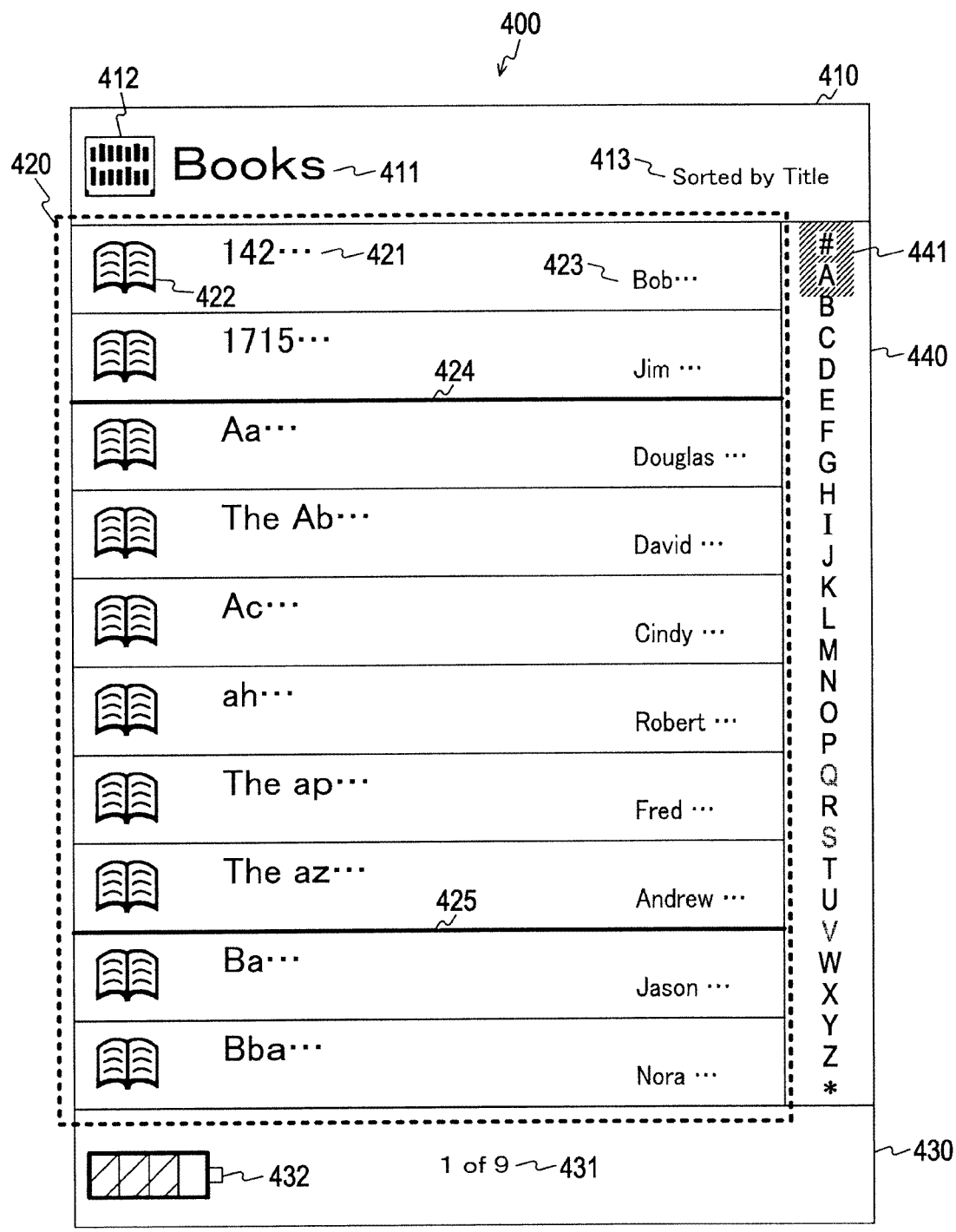
FIG. 6 is a diagram showing a display example of a content list screen on a display unit according to the first embodiment of the present invention.

FIG. 6 is a diagram showing a display example of a content list screen on the display unit 270 according to the first embodiment of the present invention. A content list screen 400 includes a list information display area 410, a content list display area 420, a lower display area 430, and a classification-sign-display-bar display area 440. In the example according to the first embodiment of the present invention, a content list is moved and displayed page by page. In display example shown in FIG. 6, a content list corresponding to the first page of the content list held in the content list holding unit 230 is displayed.

In the list information display area 410, there are displayed pieces of information indicating the kind and ordering rule of contents in a content list displayed in the content list display area 420. In the list information display area 410, for example, a content kind 411, an icon 412, and an ordering rule 413 are displayed. For example, when "book content" is selected as the kind of content in a content list, "Books" is displayed as the content kind 411, and the icon 412 indicating the content kind is displayed. The icon 412 shown in FIG. 6 is an icon representing a bookshelf in a graphic form, and indicates books. In addition, when ordering by book title is selected as the ordering rule to be applied when creating a content list, "Sorted by Title" is displayed as the ordering rule 413.

In the content list display area 420, a content list held in the content list holding unit 230 is displayed page by page. Since contents contained in the content list are of the same kind, in this example, only items placed at the top of the content list display area 420 are denoted by reference numerals and described, and description of the other items is omitted.

In the content list display area 420, a title 421 and related person's name 423 of each content are displayed in the form of letters indicating each content, and an icon 422 indicating the kind of content is displayed. In this case, the information held in the content list holding unit 230 shown in FIG. 5 is shown in the title 421 and the related person's name 423. That is, letters stored in the Title 233 and the Related Person's Name 234 corresponding to a list number "0" in the List Number 231 of the content list holding unit 234 are displayed as the title 421 and the related person's name 423. When displaying the title 421 and the related person's name 423, if a large number of letters are contained in these pieces of information, their latter half portions may be omitted from the display (for example, displayed as " . . . ").

The boundary of each item displayed in the content list display area 420 is displayed as being indicated by a solid line. In addition, like a boundary 424 between items corresponding to a classification code "#" and items corresponding to a classification code "A", a portion corresponding to the boundary between sets of items falling under different classifications is displayed as being indicated by a thick solid line. Likewise, a boundary 425 between items corresponding to the classification code "A" and items corresponding to a classification code "B" is displayed as being indicated by a thick solid line. In this way, a portion serving as the boundary between sets of items falling under different classifications is displayed in a mode different from that for other boundaries.

To display a page other than the page being displayed in the content list display area 420, for example, a desired page can be displayed by performing a depressing operation on the page scrolling button 122 or 123. In addition, a desired page can be displayed by performing a tap operation or drag operation in the classification-sign-display-bar display area 440. This tap operation or drag operation in the classification-sign-display-bar display area 440 will be described later in detail with reference to FIG. 7.

In the lower display area 430, a page number 431 and a battery remaining icon 432 are displayed. In the page number 431, numbers indicating the relationship between the page of a content list displayed in the content list display area 420, and the pages of the entire content list are displayed. For example, since the entire content list held in the content list holding unit 230 shown in FIG. 5 has nine pages, and the content list displayed in the content list display area 420 shown in FIG. 6 is that of the first page, "1 of 9" is displayed in the page number 431. In the battery remaining icon 432, for example, an icon indicating the state of charge of a battery (not shown) built in the information processing apparatus 100 is displayed.

In the classification-sign-display-bar display area 440, classification signs indicating an ordering rule of a content list displayed in the content list display area 420 are ordered on the basis of the rule and displayed. In the example shown in FIG. 6, as classification signs indicating an ordering rule for each classification, a classification sign "#" indicating a numeral, classification signs "A to Z" indicating individual alphabets, and a classification sign "*" indicating another symbol are used. In addition, in the example shown in FIG. 6, the ordering rule is set such that contents are ordered in dictionary order, and content whose title begins with a numeral is ordered before "A". In addition, content whose title begins with a symbol (for example, ★) other than a numeral or an alphabet is ordered after "Z". Therefore, classification signs "#", "A to Z" and "*" are ordered so as to be arranged vertically in the classification-sign-display-bar display area 440. As indicated by the Classification Code 236 in FIG. 5, on the basis of the ordering rule, items contained in a content list displayed in the content list display area 420 are classified.

Among individual classification signs ordered in the classification-sign-display-bar display area 440, classification signs corresponding to individual items contained in the content list held in the content list holding unit 230 shown in FIG. 5, and the other classification signs are displayed in different modes. For example, classification signs corresponding to individual items contained in the content list held in the content list holding unit 230 shown in FIG. 5 (for example, "#", "A", and the like) are displayed in a black color. On the other hand, classification signs not corresponding to individual items contained in the content list ("Q", "S", and "V" in this example) are displayed in a gray color. Thus, it is possible to quickly grasp which items can be displayed in the content list display area 420, among individual items contained in the content list held in the content list holding unit 230 shown in FIG. 5.

In addition, among individual classification signs ordered in the classification-sign-display-bar display area 440, classification signs corresponding to individual items included on a page displayed in the content list display area 420, and the other classification signs are displayed in different modes. In this case, the display mode of classification signs corresponding to individual items contained in the content list held in the content list holding unit 230, and the display mode of the other classification signs are made to differ from each other so as to allow discrimination between the two display modes. For example, as shown in FIG. 6, a current-display-page indicator bar 441 is displayed so as to cover classification signs corresponding to individual items included on a page displayed in the content list display area 420. For example, the background area of classification signs in the classification-sign-display-bar display area 440 is displayed in a while color, and the current-display-page indicator bar 441 can be displayed as a rectangle in a gray color lighter than the gray color applied to classification signs not stored in the Classification Code 236. This makes it possible to quickly grasp items that can be displayed in the content list display area 420 as described above, and also quickly grasp classification signs corresponding to items included on a page displayed in the content list display area 420.

At this time, "#", "A", and "B" are stored in the Classification Code 236 corresponding to items included on page 1 of the content list held in the content list holding unit 230 shown in FIG. 5. In addition, "B" to "E" are stored in the Classification Code 236 corresponding to items included on page 2 of the content list. That is, items corresponding to the classification sign "B" are included on page 1 and page 2. Accordingly, to indicate that items corresponding to the classification sign "B" are included on page 1 and page 2, the current-display-page indicator bar 441 is displayed so as to cover all of the classification signs "#" and "A" and a part of the classification sign "B". A computing method for the display area of the current-display-page indicator bar 441 will be described later in detail with reference to FIG. 7. In this way, classification signs corresponding to items contained in the content list displayed in the content list display area 420 can be easily grasped by displaying these classification signs so as to be covered by the current-display-page indicator bar 441.

By performing an operation of depressing the portion of a desired classification sign among individual classification signs ordered in the classification-sign-display-bar display area 440, a page containing items corresponding to the depressed classification sign can be displayed. The method of displaying a page in a case when the portion of a classification sign corresponding to a plurality of pages (for example, the classification sign "B") will be described later in detail with reference to FIG. 7.

A case may occur in which classification signs displayed in a gray color (for example, "Q", "S", and "V") exist between a classification sign corresponding to the first item and a classification sign corresponding to the last item, among individual contents included on a page displayed in the content list display area 420. In this case, the current-display-page indicator bar 441 is not split at the portion of the classification signs displayed in a gray color, and the current-display-page indicator bar 441 is displayed so as to cover the classification signs displayed in a gray color. It should be noted, however, that the current-display-page indicator bar 441 is displayed in such a way that in the area covered by the current-display-page indicator bar 441, the portion of classification signs displayed in a gray color and the portion of classification signs displayed in a black color can be discriminated from each other. This makes it possible to intuitively grasp the range of items included on a page displayed in the content list display area 420. That is, the position of the current page, and also books beginning with what letters exist on the current page can be easily grasped by the user. Thus, when a part of a content list is displayed, the outline of items included on the current display screen within the entire content list can be easily grasped. In addition, when displaying a page containing desired books, this page can be displayed easily and quickly.

The first embodiment of the present invention is directed to the case in which the moving direction of a content list and the ordering direction of classification signs in the classification-sign-display-bar display area 440 are the same. However, the display may be such that the two directions are different, such as when making these directions orthogonal to each other.

[Display Example of Classification-Sign-Display-Bar Display Area]

FIG. 7 is a diagram schematically showing the relationship between the content list held in the content list holding unit 230 and the classification-sign-display-bar display area 440 according to the first embodiment of the present invention. The information held in the content list holding unit 230 shown in FIG. 7(a) is the same as that shown in the example of FIG. 5, except that a part of the information shown in the example of FIG. 5 is omitted.

In FIG. 7(b), only a part of the upper and lower sides of the classification-sign-display-bar display area 440 included in the content list screen 400 shown in FIG. 6 is shown in an enlarged fashion. The other part of the classification-sign-display-bar display area 440 is omitted.

As described above, the display mode in the classification-sign-display-bar display area 440 is varied in accordance with items included on a page displayed in the content list display area 420. For example, suppose a case in which items included on the first page of the content list held in the content list holding unit 230 are displayed in the content list display area 420. In this case, in the classification-sign-display-bar display area 440, classification signs ("#", "A", and "B") corresponding to the items included on the first page, and the other classification signs ("C" to "Z", and "*") are displayed in different modes. For example, for the content list held in the content list holding unit 230, the page of each item can be identified by a page number stored in the Page Number 235. For example, items included on the first page of the content list held in the content list holding unit 230 are items corresponding to list numbers "0" to "9" in the List Number 231, and "#", "A", and a part of "B" are stored in the Classification Code 236. Thus, in order to indicate that items corresponding to classification signs "#", "A", and "B" are displayed, for example, as shown in FIG. 7(b), the current-display-page indicator bar 441 is displayed so as to cover the classification signs "#", "A", and "B".

At this time, in the area corresponding to the classification sign "B" in the classification-sign-display-bar display area 440, the current-display-page indicator bar 441 is displayed in only a part of the area. This makes it possible to notify the user of the fact that items corresponding to the classification sign "B" are included on a page displayed in the content list display area 420, and that items corresponding to the classification sign "B" are also included on the next page. In the following, a description will be given of the method of displaying the current-display-page indicator bar 441 in a case when items corresponding to the same classification sign are included on a plurality of pages.

For example, a description will be given of a case in which a change operation has been made to specify a desired page with respect to a content list displayed in the content list display area 420, and display items included on this specified page. In this case, the classification-sign-display-bar controlling unit 240 acquires classification codes in the Classification Code 236 corresponding to items included on the specified page of the content list held in the content list holding unit 230. Then, the classification-sign-display-bar controlling unit 240 identifies the classification codes located at the upper and lower ends from among the acquired classification codes. Then, the classification-sign-display-bar controlling unit 240 determines whether or not classification codes that are the same as the classification code located at the lower end are included on the next page. If classification codes that are the same as the classification code located at the lower end are included on the next page, the classification-sign-display-bar controlling unit 240 computes the ratio between the number of the same classification codes as the classification code located at the lower end which are included on the specified page, and the number of the same classification codes included on the next page. Then, on the basis of the computed ratio, the display control unit 260 displays the current-display-page indicator bar 441 with respect to an area corresponding to the classification sign of the classification code located at the lower end which is included on the specified page. On the other hand, if classification codes that are the same as the classification code located at the lower end are not included on the next page, the display control unit 260 displays the current-display-page indicator bar 441 so as to cover the entire area corresponding to the classification sign of the classification code located at the lower end which is included on the specified page. Likewise, with respect to the classification code located at the upper end as well, the ratio of the same classification codes included on page 2 is computed, and on the basis of the computed ratio, the current-display-page indicator bar 441 is displayed with respect to an area corresponding to the classification sign of the classification code located at the upper end which is included on the specified page.

For example, suppose a case in which, in the example shown in FIG. 7, the specified page is page 1. In this case, the classification-sign-display-bar controlling unit 240 acquires classification codes in the Classification Code 236 corresponding to items included on the first page of the content list held in the content list holding unit 230, and then identifies the classification codes located at the upper and lower ends from among the acquired classification codes. For example, among the classification codes in the Classification Code 236 corresponding to items included on the first page, the classification code located at the upper end is "#", and the classification code located at the lower end is "B". In the case where the specified page is page 1, there is no previous page, so the determination of whether or not the classification code "#" located at the upper end is included on the previous page is omitted.

Subsequently, the classification-sign-display-bar controlling unit 240 determines whether or not the classification code "B" located at the lower end is included on the second page. As shown in FIG. 7(a), the classification code "B" located at the lower end is included on the second page, so the classification-sign-display-bar controlling unit 240 computes the ratio between the number of the classification codes "B" located at the lower end which are included on the first page, and the number of the classification codes "B" included on page 2. In the example shown in FIG. 7(a), the number of the classification codes "B" included on the first page is 2, and the number of the classification codes "B" included on the second page is 4, so the total number of the classification codes "B" is 6. Hence, the ratio of the classification codes "B" included on the first page is equal to ⅖, and the ratio of the classification codes "B" included on the second page is equal to ⅘. On the basis of this computed ratio, the current-display-page indicator bar 441 is displayed with respect to the area corresponding to the classification sign "B". That is, a vertical length h1 is computed by using Equation 1 below, and within the area corresponding to the classification sign "B", the current-display-page indicator bar 441 is displayed in an area corresponding to the length h1.

$$h1=(m/(m+n))h \qquad \text{Equation 1}$$

In the above equation, h denotes a value indicating the vertical length of a rectangular area corresponding to each classification sign. Also, m denotes the number of classification codes included on a specified page, and n denotes the number of the classification codes included on the next page.

Suppose a case in which, in the example shown in FIG. 7, the specified page is page 2. In this case as well, the classification-sign-display-bar controlling unit 240 acquires classification signs in the Classification Code 236 corresponding to items included on the second page of the content list held in the content list holding unit 230. Then, the classification-sign-display-bar controlling unit 240 identifies the classification codes located at the upper and lower ends from among the acquired classification codes. For example, among the classification codes in the Classification code 236 corresponding to items included on the second page, the classification code located at the upper end is "B", and the classification code located at the lower end is "E".

Subsequently, on the basis of the computing method described above, the classification-sign-display-bar controlling unit 240 computes the number of the classification codes "B" located at the upper end which are included on the second page, and the number of the classification codes "B" included on page 1. That is, a vertical length h2 is computed by using Equation 2 below, and within the area corresponding to the classification sign "B", the current-display-page indicator bar 441 is displayed in an area corresponding to the length h2.

$$h2=(q/(p+q))h \qquad \text{Equation 2}$$

In the above equation, h denotes a value indicating the vertical length of a rectangular area corresponding to each classification sign. Also, q denotes the number of classification codes included on a specified page, and p denotes the number of the classification codes included on the next page.

Likewise, the classification-sign-display-bar controlling unit 240 computes the number of the classification codes "E" located at the upper end which are included on the second page, and the number of the classification codes "E" included on page 3. That is, a vertical length h3 is computed by using Equation 1 described above, and within the area corresponding to the classification code "E", the current-display-page indicator bar 441 is displayed in an area corresponding to the length h3. That is, in the example shown in FIG. 7, in the case where the specified page is page 2, the current-display-page indicator bar 441 is displayed in the area of the classification sign "B" corresponding to the length h2, the areas corresponding to the classification signs "C" and "D", and the area of the classification sign "E" corresponding to the length h3.

Next, a description will be given of a page scrolling operation on a content list displayed in the content list display area 420. In this case, the description is directed to a case in which the page scrolling operation is performed by a touch operation on the classification-sign-display-bar display area 440. It should be noted that since the page scrolling operation using the page scrolling buttons 122 and 123 is the same as the above-described operation, description thereof is omitted here.

First, a touch operation on the touch panel 112 will be described. For example, the touch panel 112 detects a position on a display surface touched by an object, and detects a position at which the object is released from the display surface after touching the display surface. For example, on the display surface of the touch panel 112, the position first touched by a user's finger (touch start position), and the position at which the finger is released from the display surface after the touch (touch end position) are detected. Then, for example, a touch operation on the touch panel 112 is identified at the timing when the touch end position is detected on the display surface. In the following, a tap operation and a drag operation will be described as examples of this touch operation.

A tap operation means, for example, an operation of touching a desired position on the display surface of the touch panel 112. This tap operation is preferably performed by, for example, touching the display surface of the touch panel 112 with a finger in a light tapping motion. For example, a tap operation is performed when performing a selecting operation of selecting a desired item. In this case, an operation input according to the tap operation is accepted at the timing when the touch end position is detected. It should be noted that in the case of a tap operation, a touch operation is performed instantaneously, so the touch start position and the touch end position become substantially the same.

A drag operation means an operation of sliding a finger in an intended direction and by an intended amount of movement in a state with the finger touching the display surface of the touch panel 112. For example, a drag operation is performed when performing a moving operation of moving an image on the display surface of the touch panel 112. In this case, an operation input including information on a direction and an amount of movement according to the drag operation is accepted at the timing when the touch end position is detected.

Next, a description will be given of a case in which a tap operation or a drag operation has been made by the user in the classification-sign-display-bar display area 440 displayed on the display unit 270.

When a tap operation has been made by the user in the classification-sign-display-bar display area 440, the operation is identified at the timing when release of a finger is detected after detection of the finger due to the tap operation. Then, a page scrolling operation is performed with reference to the position detected by the tap operation. When a drag operation has been made by the user in the classification-sign-display-bar display area 440, the operation is identified at the timing when release of a finger is detected after detection of the finger due to the drag operation. Then, a page scrolling operation is performed with reference to the position at which the finger is released due to the drag operation.

In this way, when a tap operation or a drag operation has been made on the classification-sign-display-bar display area 440, a position detected by each of the operations is outputted from the operation accepting unit 210 to the classification-sign-display-bar control unit 240. Subsequently, the classification-sign-display-bar control unit 240 identifies a page corresponding to the detected position on the basis of a content list held in the content list holding unit 230. Then, the classification-sign-display-bar control unit 240 outputs the identified page to the display control unit 260 as a page to be displayed in the content list display area 420. For example, if the area of "#" or "A" in the classification-sign-display-bar display area 440 corresponds to a position detected upon a tap operation or a drag operation, page 1 is identified as shown in FIG. 7(*b*). In addition, for example, if a tap operation or a drag operation has been made with respect to the area of "B" in the classification-sign-display-bar display area 440, it is determined whether or not the detected position is included within the upper ⅓ of the area of "B", and whether or not the detected position is included within the lower ⅔ of the area. Then, if the detected position is within the upper ⅓ of the area of "B", page 1 is identified. On the other hand, if the detected position is included within the lower ⅔ of the area of "B", page 2 is identified. In this way, since a page scrolling operation can be performed through a tap operation or a drag operation in the classification-sign-display-bar display area 440, a page desired by the user can be quickly displayed with reference to the alphabets in the classification-sign-display-bar display area 440.

The above-described example is directed to the case of displaying items corresponding to the same classification sign when these items are included over two pages, or the case of computing the ratio of each of these items on each page when a tap operation or the like has been made on an area corresponding to the classification sign. However, for example, it is also possible to compute the ratio at the time of creating a content list, hold information related to the computed ratio together with the content list, and use the held information when display of the information or a tap operation or the like has been performed.

Further, the above-described example is directed to the case of performing a page scrolling operation when a tap operation or a drag operation has been performed in the classification-sign-display-bar display area 440. It should be noted, however, that a page scrolling operation may be performed by, for example, performing a moving operation of moving the current-display-page indicator bar 441 in the classification-sign-display-bar display area 440 by using another operating member.

Further, the above-described example is directed to the case in which a content list is held in advance, and a part of this content list is displayed. However, for example, a content list may be created every time a page scrolling operation is performed, and items corresponding to the page scrolling operation may be displayed. Further, if the content list is not spread over a plurality of pages, the classification-sign-display-bar display area 440 may not be displayed.

[Display Examples of Screens]

Figure 8:
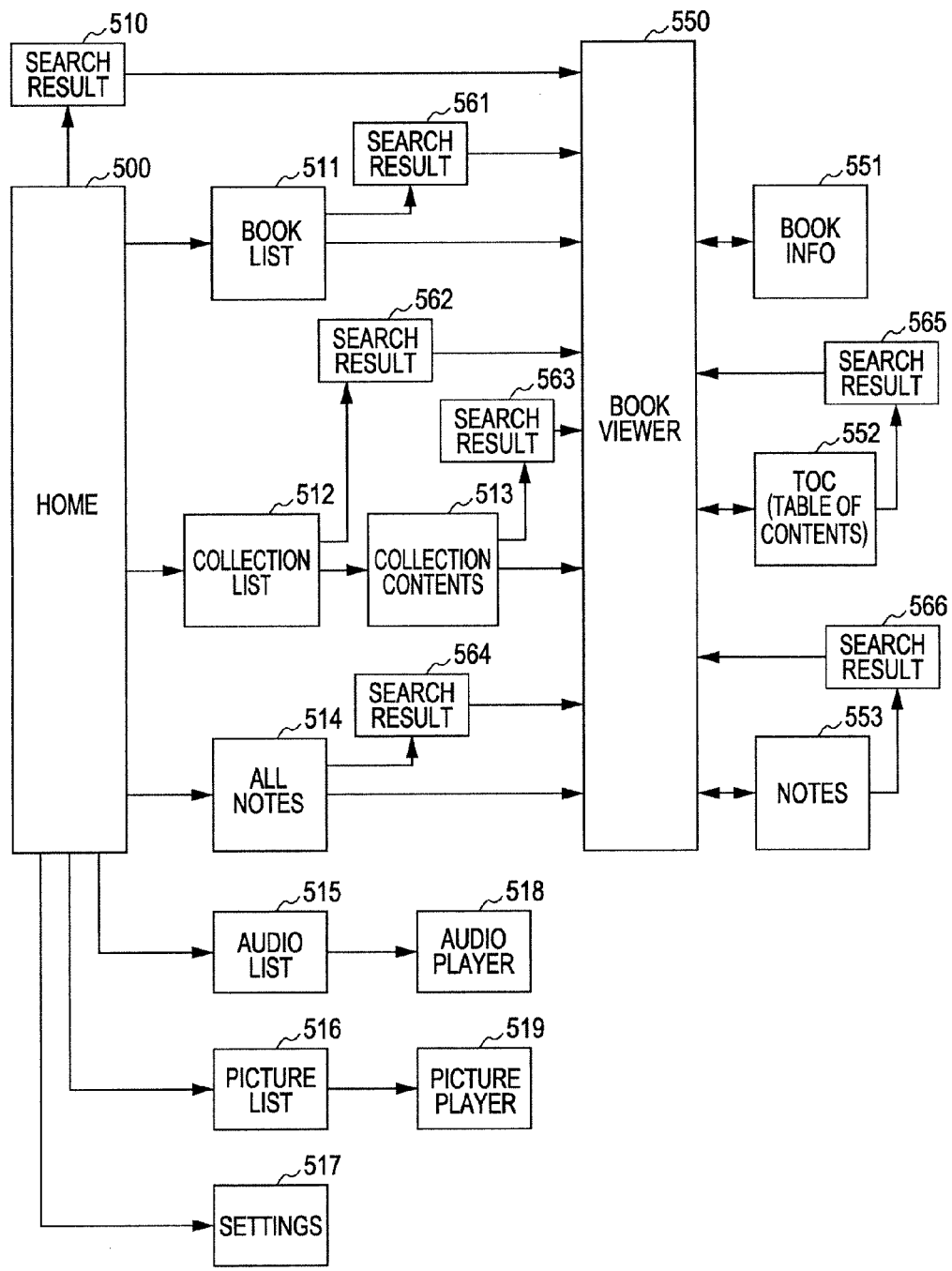
FIG. 8 is a diagram showing an example of transitions between individual screens displayed on an input/output panel according to the first embodiment of the present invention.

FIG. 8 is a diagram showing an example of transitions between individual screens displayed on the input/output panel 110 according to the first embodiment of the present invention. A home screen (home) 500 is a home screen 500 shown in FIG. 9. A selecting operation on the home screen will be described later in detail with reference to FIG. 9.

When the home screen 500 is displayed, list screens 511 to 516 and a Settings screen 517 can be displayed by making a predetermined operation input. In addition, by selecting book content on the list screens 511 to 514, a Book Viewer screen 550 for viewing books can be displayed. On the Book Viewer screen 550, a Book Info screen 551, a TOC screen 552, and a Notes screen 553 can be displayed as appropriate.

Also, by selecting music content on an Audio List screen 515, music content can be played back. By selecting image content on a Picture List screen 516, image content can be played back.

In a case where the home screen 500 is displayed, when the search button 125 is depressed, a Search Result screen 510 is displayed, and the Book Viewer screen 550 can be displayed on the basis of the search results on the Search Result screen 510. For the screens 511 to 514, 552, and 553 as well, Search Result screens 561 to 566 can be displayed by depressing the search button 125, and a search can be made on each of these screens.

FIG. 9 is a diagram showing a display example of the home screen 500 displayed on the input/output panel 110 according to the first embodiment of the present invention. The home screen 500 is the top-level screen (a so-called start screen) of screens displayed on the input/output panel 110. The home screen 500 can be displayed at any time by a depressing operation on the home button 124, even when other screens are being displayed.

The home screen 500 displays a reading selecting area (Continue Reading) 501, a book content selecting area (Books) 502, and a notes selecting area (All Notes) 503. Also, the home screen 500 displays a collection selecting area (Collections) 504, a music selecting area (Audio) 505, an image selecting area (Pictures) 506, and a settings screen selecting area (Settings) 507. In each of these areas, an icon indicating information on each area, and letters indicating the information are displayed.

The reading selecting area 501 is an area selected when directly displaying a book content that was open immediately before. That is, when the reading selecting area 501 is depressed, a book content that was open immediately before can be displayed, without displaying a content list of book contents. In addition, a page of the book content which was displayed immediately before is displayed. In the reading selecting area 501, the title of the book content that was displayed immediately before is displayed.

The book content selecting area 502 is an area selected when displaying a content list screen (the list screen 511 shown in FIG. 8) for displaying a content list of book contents.

The notes selecting area 503 is an area selected when advancing to a content list screen (the list screen 514 shown in FIG. 8) for displaying a content list of Bookmarks and Highlights created by the user. Through a selecting operation on the notes selecting area 503, individual pieces of notes information for all book contents can be displayed as a content list.

The collection selecting area 504 is an area selected when advancing to a content list screen (the list screen 512 shown in FIG. 8) for displaying a content list of collections created by the user.

The music selecting area 505 is an area selected when advancing to a content list screen (the list screen 515 shown in FIG. 8) for displaying a content list of music contents.

The image selecting area 506 is an area selected when advancing to a content list screen (the list screen 516 shown in FIG. 8) for displaying a content list of image contents.

The settings screen selecting area 507 is an area selected when advancing to a settings screen (the Settings screen 517 shown in FIG. 8) for making various settings.

These selecting operations are realized by, for example, a user's tap operation on the input/output panel 110. It should be noted that even when music content is being played back, content other the music content can be also played back on each screen.

Next, a description will be given of a case in which a selecting operation of selecting the book content selecting area 502 has been made on the home screen 500.

Figure 10:
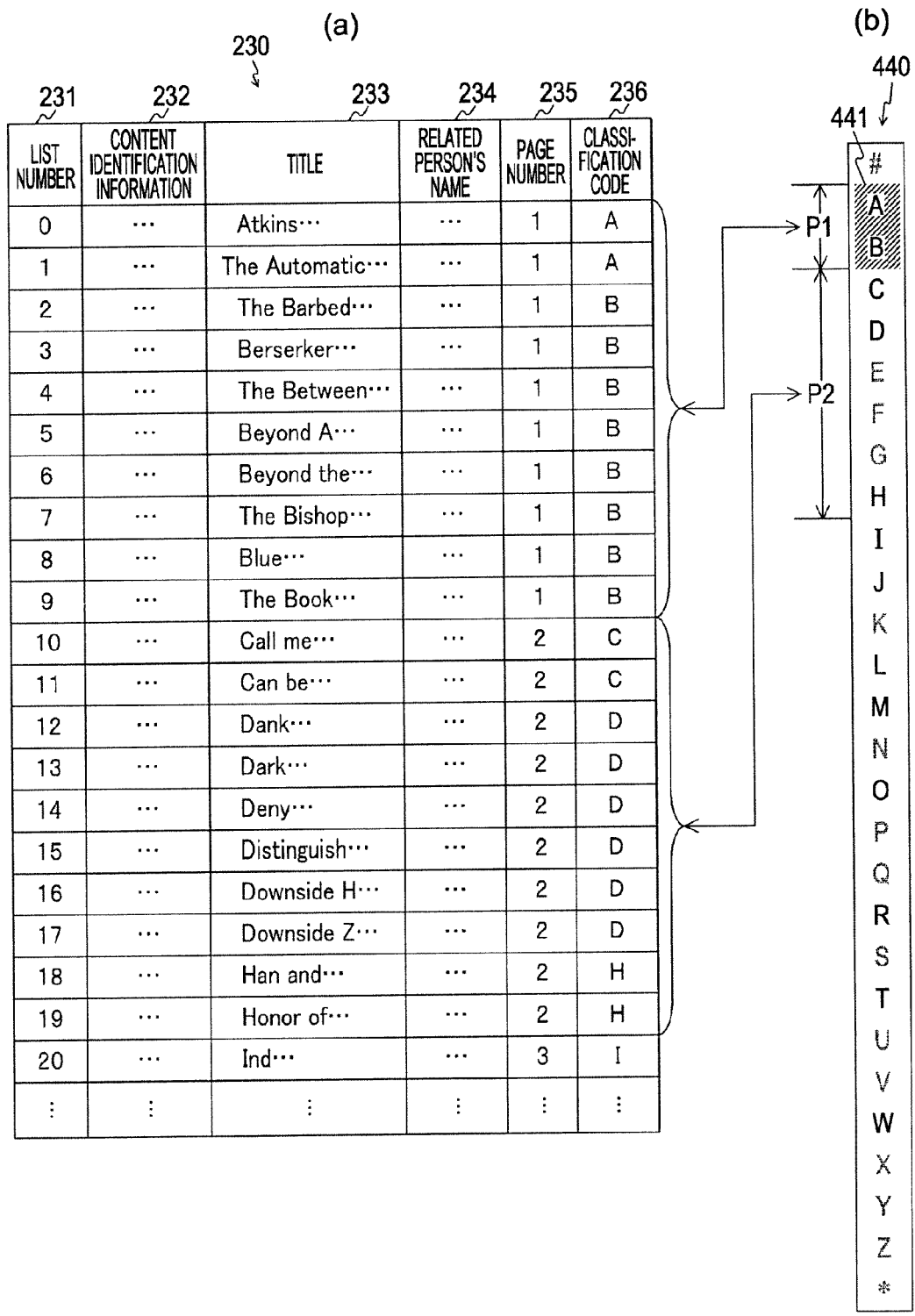
FIG. 10 is a diagram schematically showing the relationship between a content list held in the content list holding unit, and the classification-sign-display-bar display area according to the first embodiment of the present invention.

FIG. 10 is a diagram schematically showing the relationship between the content list held in the content list holding unit 230, and the classification-sign-display-bar display area 440 according to the first embodiment of the present invention. It should be noted that the relationship between the two is the same as that of the example shown in FIG. 7, except that the contents differ. Accordingly, in the following, the common parts are denoted by the same reference numerals and detailed description thereof is omitted.

FIG. 10(*a*) schematically shows a content list created by the content list creating unit 220, and held in the content list holding unit 230. This example shows an example of a content list created on the basis of the titles of book contents when the book content selecting area 502 is selected by the user on the home screen 500. In FIG. 10(*a*), information in the Content Identification Information 232 and the Related Person's Name 234 is omitted.

FIG. 10(*b*) shows an example of display in the classification-sign-display-bar display area 440. Unlike the example shown in FIG. 7(*b*), FIG. 10(*b*) shows the whole of the classification-sign-display-bar display area 440 included on the content list screen 400 shown in FIG. 6. In this example, classification signs corresponding to items contained in the content list held in the content list holding unit 230 which is shown in FIG. 10(*a*) are indicated as "A" to "D", "H" to "J", and so on, and these classification signs are displayed in a black color. Also, classification signs not corresponding to items contained in the content list are indicated as "#", "E" to "G", and so on, and these classification signs are displayed in a gray color.

As described above, the display mode in the classification-sign-display-bar display area 440 is varied in accordance with items included on a page displayed in the content list display area 420. For example, suppose a case in which items included on the first page of the content list held in the content list holding unit 230 are displayed in the content list display area 420. In this case, in the classification-sign-display-bar display area 440, classification signs ("#", "A", and "B") corresponding to the items included on the first page, and the other classification signs ("C" to "Z", and "*") are displayed in different modes. For example, as shown in FIG. 10(*b*), the current-display-page indicator bar 441 is displayed so as to cover classification signs ("A" and "B") corresponding to the items included on the page displayed in the content list display area 420. An example of display of the content list screen 400 in this case is shown in FIG. 11.

Also, for example, suppose a case in which items included on the second page of the content list held in the content list holding unit 230 are displayed in the content list display area 420. In this case, in the classification-sign-display-bar display area 440, classification signs ("C" to "H") corresponding to the items included on the second page, and the other classification signs ("#", "A", "B", "I" to "Z", and "*") are displayed in different modes. An example of display of the content list screen 400 in this case is shown in FIG. 12.

Figure 11:
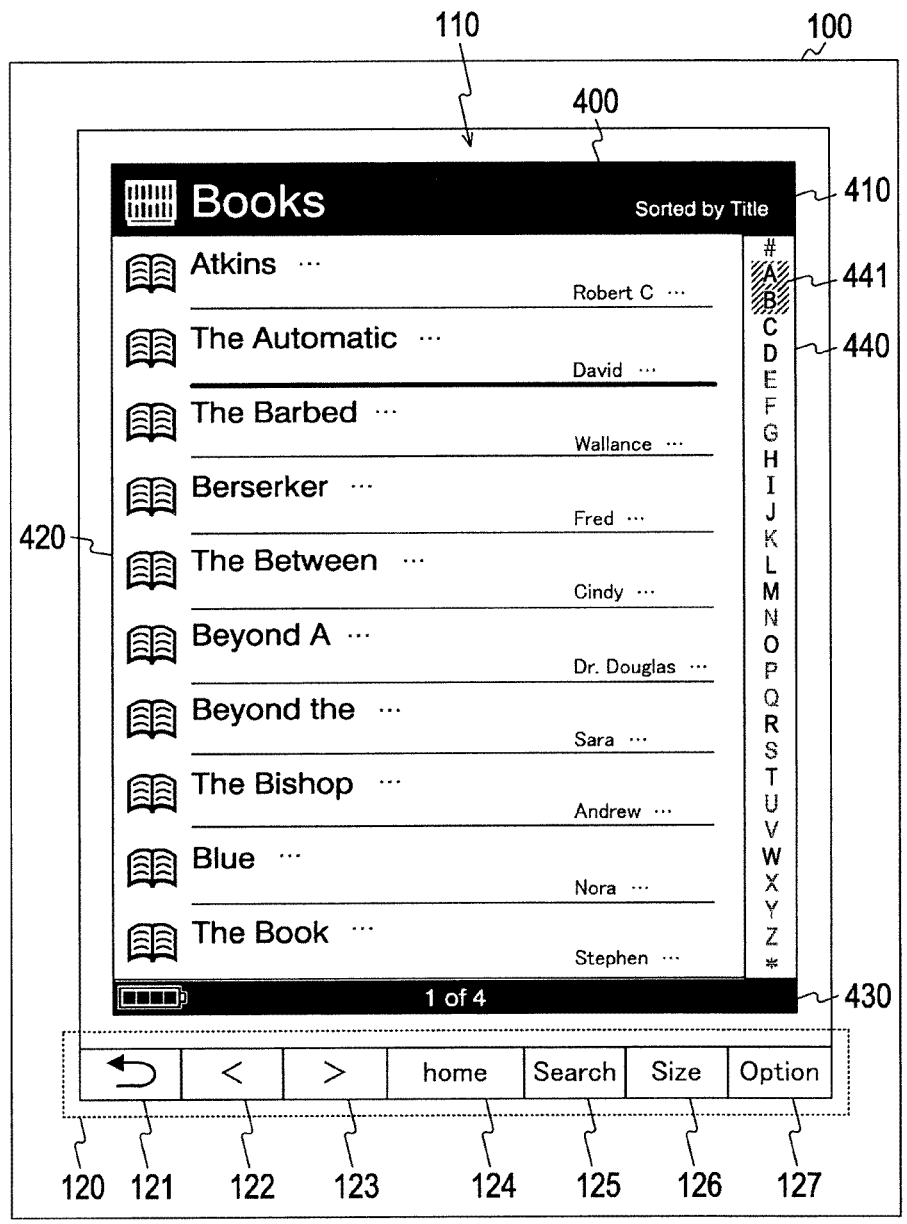
FIG. 11 is a diagram showing a display example of a content list screen on the input/output panel according to the first embodiment of the present invention.
Figure 12:
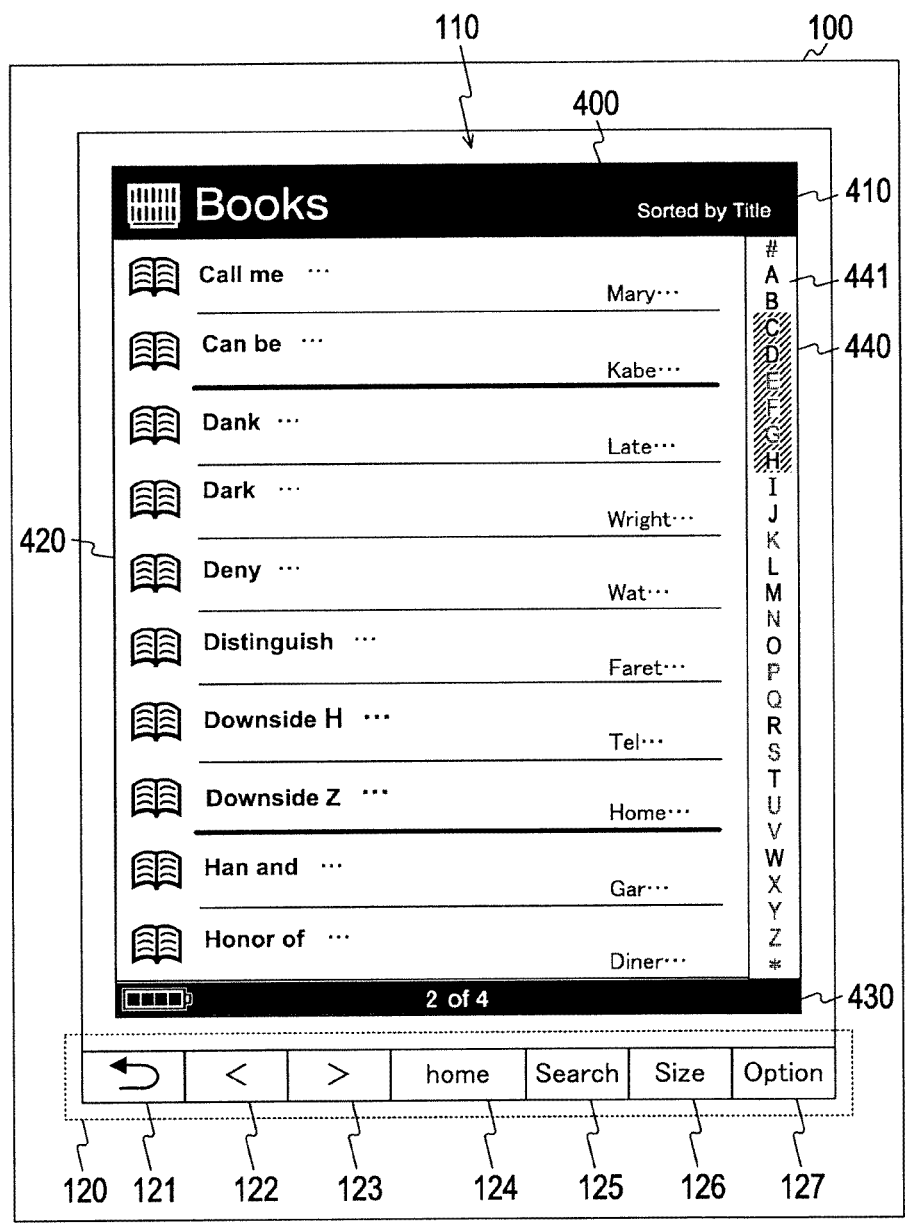
FIG. 12 is a diagram showing a display example of a content list screen on the input/output panel according to the first embodiment of the present invention.

FIG. 11 and FIG. 12 are diagrams showing display examples of content list screen on the input/output panel 110 according to the first embodiment of the present invention. These display examples are the same as the example shown in FIG. 6, except that the contents differ. Accordingly, the common parts are denoted by the same reference numerals and detailed description thereof is omitted.

The display example shown in FIG. 11 displays a content list corresponding to the first page of the content list held in the content list holding unit 230 shown in FIG. 10(*a*). The display example shown in FIG. 12 displays a content list corresponding to the second page of the content list held in the content list holding unit 230 shown in FIG. 10(*a*).

Next, a description will be given of the case of changing the ordering rule of contents, or the display mode of items in a content list, in a case when the content list screen 400 is displayed on the display unit 270.

Figure 13:
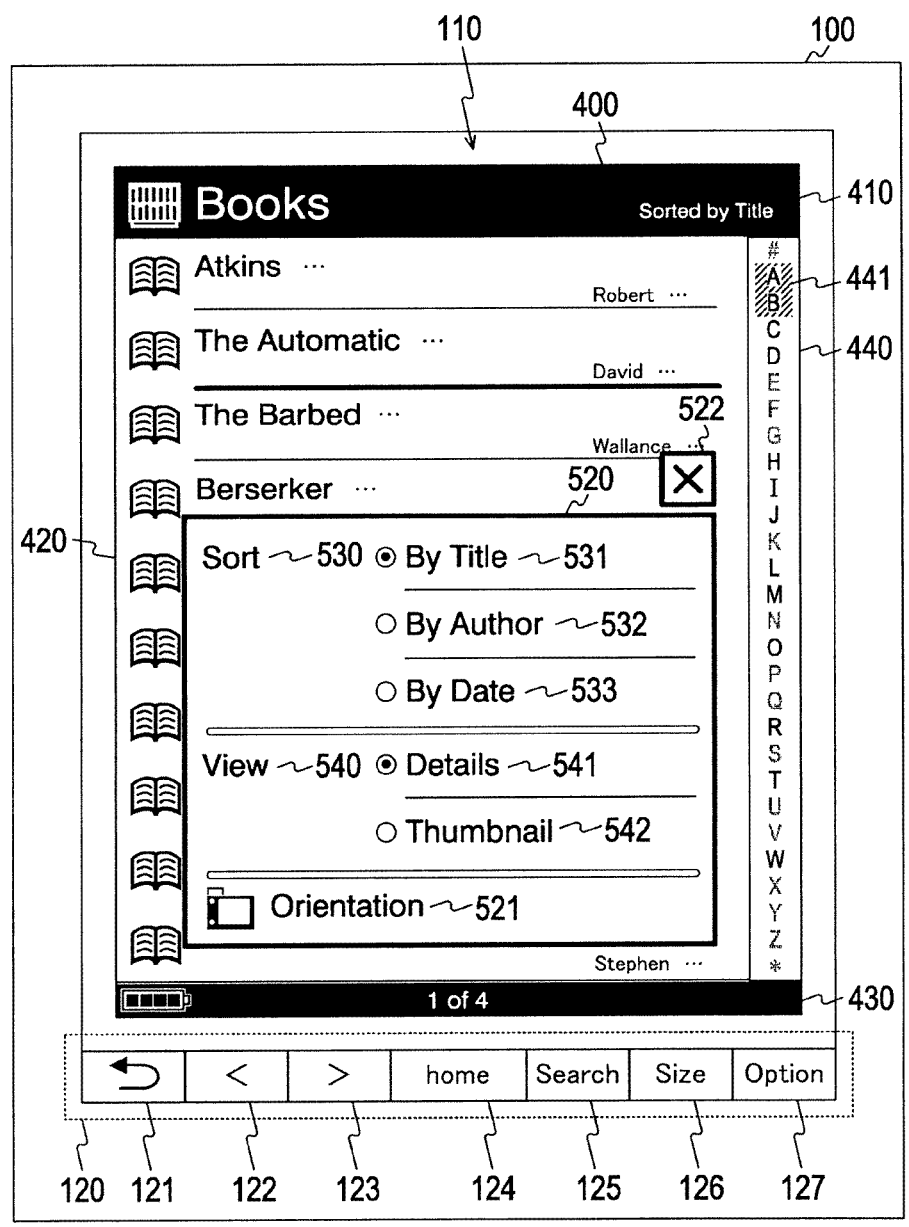
FIG. 13 is a diagram showing a display example of an option screen on the input/output panel according to the first embodiment of the present invention.

FIG. 13 shows a display example of option screen on the input/output control panel 110 according to the first embodiment of the present invention. Since the content list screen 400 displayed in the background of an option screen 520 is the same as that of the display example shown in FIG. 11, description thereof is omitted here.

For example, when the content list screen 400 shown in FIG. 11 is displayed on the display unit 270, the option screen 520 can be displayed by the user depressing the option button 127. For example, the option screen 520 can be displayed on the screen displayed at the time of depression of the option button 127.

The option screen 520 includes a content ordering rule (Sort) 530, and a display mode (View) 540.

Figure 14:
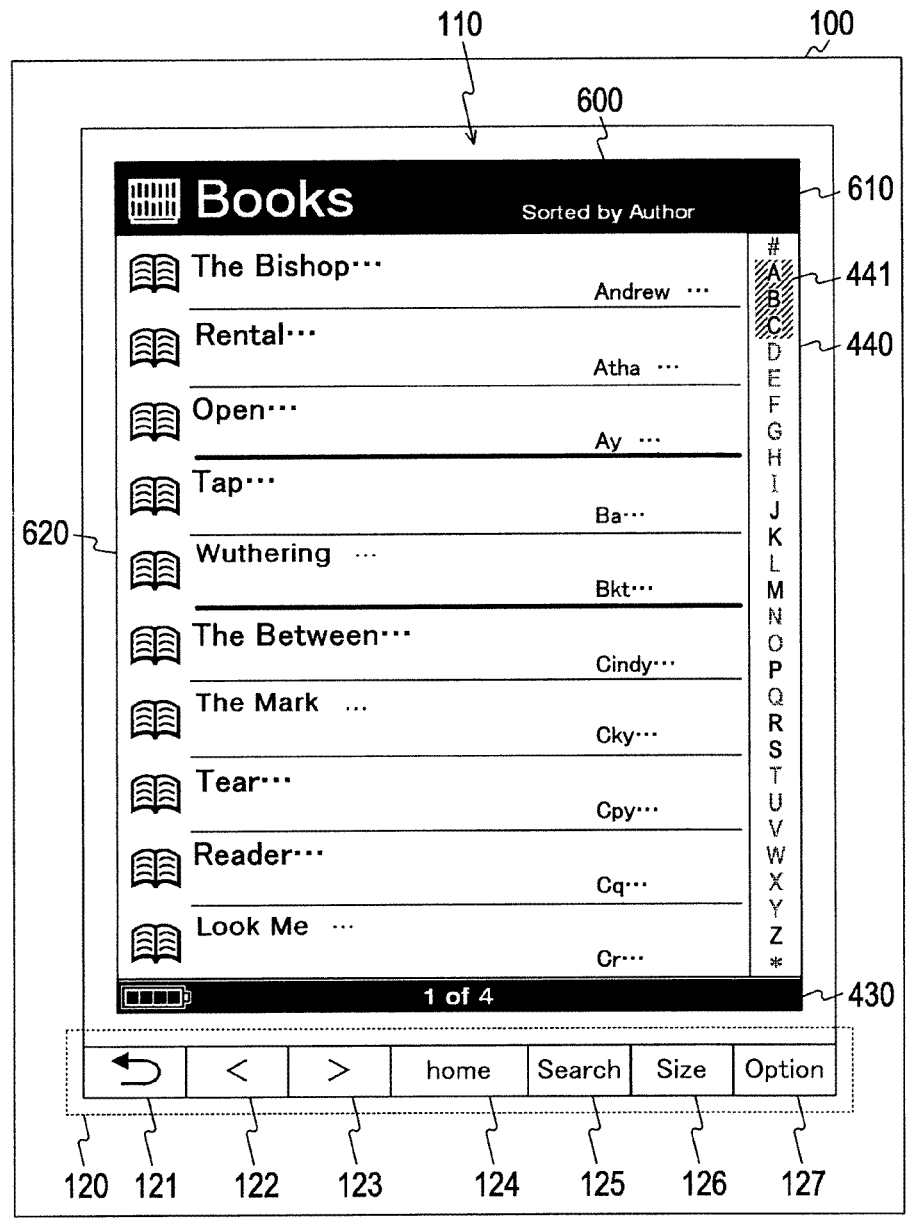
FIG. 14 is a diagram showing a display example of a content list screen on the input/output panel according to the first embodiment of the present invention.

The content ordering rule 530 is an area for selecting an ordering rule to be applied when creating a content list. For example, By Title 531, By Author 532, and By Date 533 can be selected. For example, when the By Title 531 is selected, as described above, a content list of book contents in which the titles of book contents are ordered in dictionary order is created. When the By Author 532 is selected, as shown in FIG. 14, a content list of book contents in which the last names of the authors of individual book contents are ordered in dictionary order is created. When the By Date 533 is selected, a content list of book contents in which the purchase dates of individual book contents are ordered on a time series is created.

Figure 15:
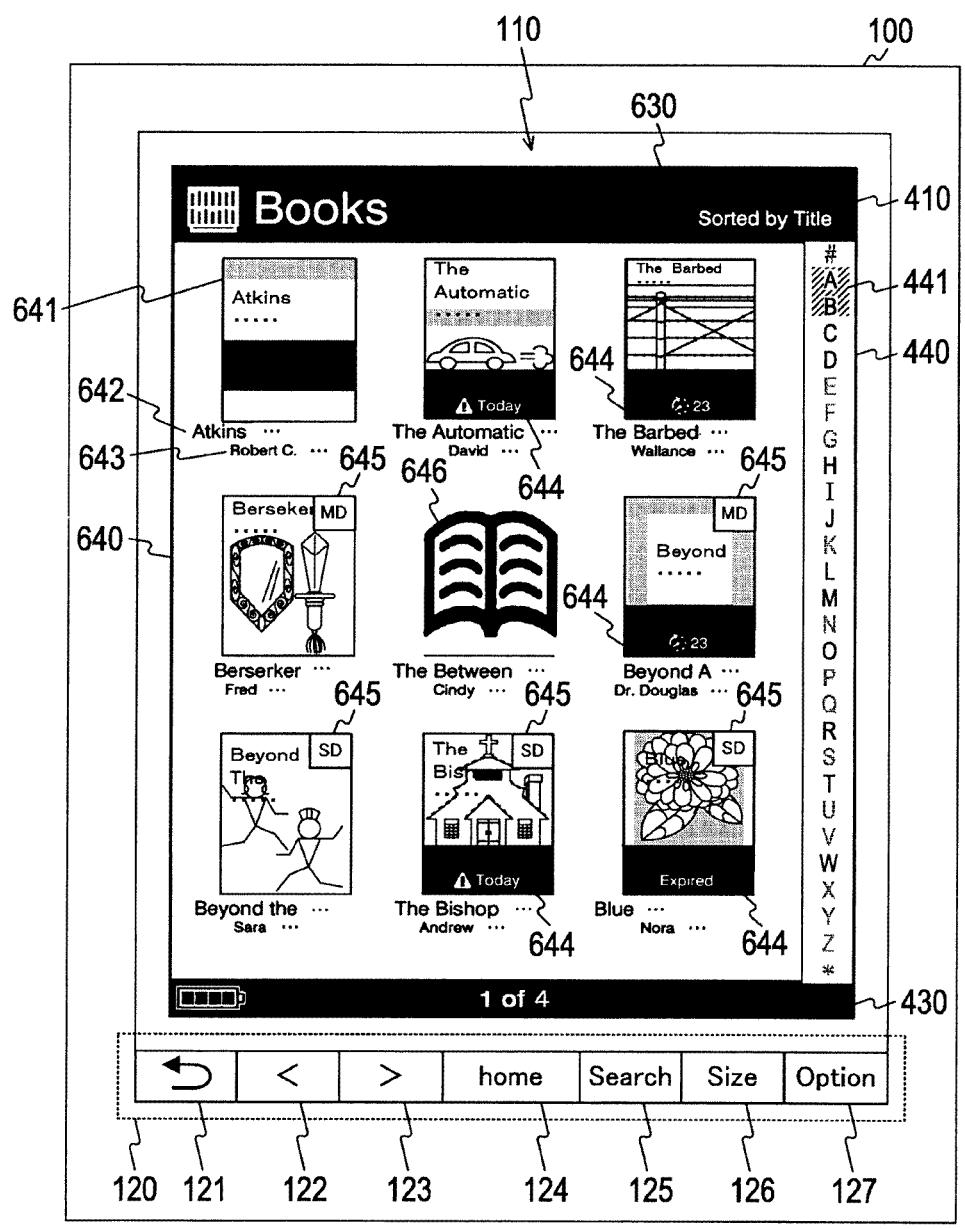
FIG. 15 is a diagram showing a display example of a content list screen on the input/output panel according to the first embodiment of the present invention.

The display mode (View) 540 is an area for selecting a display mode in which a content list is displayed. For example, Details 541 and Thumbnail 542 can be selected. For examples, when the Details 541 is selected, as described above, a content list is displayed in which the titles and names of authors of individual book contents are ordered in an item-by-item arrangement. When the Thumbnail 542 is selected, as shown in FIG. 15, a content list is displayed in which the thumbnails, titles and names of authors of individual book contents are ordered in a matrix arrangement.

These selecting operations can be made by, for example, checking corresponding radio buttons. When these selecting operations have been made and respective settings have been made, the settings are held until a predetermined operation (for example, an operation of resetting the settings, or an operation of turning off the power of the information processing apparatus 100) is made.

FIG. 14 is a diagram showing a display example of a content list screen on the input/output panel 110 according to the first embodiment of the present invention. This display example represents an example of a content list created displayed when the By Author 532 and the Details 541 are selected on the option screen 520 shown in FIG. 13. This display example is the same as the example shown in FIG. 6, except that a content list of book contents is created in which the last names of the authors of individual book contents are ordered in dictionary order. Accordingly, the common parts are denoted by the same reference numerals and detailed description thereof is omitted.

A content list screen 600 shown in FIG. 14 includes a list information display area 610 and a content list display area 620. It should be noted that in the display example shown in FIG. 14, a content list corresponding to the first page of the content list held in the content list holding unit 230 is displayed.

The list information display area 610 is substantially the same as the list information display area 410 shown in FIG. 6, the difference being that "Sorted by Author" is displayed in the portion corresponding to the ordering rule 413 in the list information display area 410. The letters "Sorted by Author" indicate that it has been selected to order contents on the basis of the author names of books, as the ordering rule to be applied when creating a content list.

The content list display area 620 is substantially the same as the content list display area 420 shown in FIG. 6, the difference being the thick solid line drawn at each boundary between sets of items. That is, this thick solid line is drawn at a portion that serves as the boundary between sets of items falling under different classifications.

FIG. 15 is a diagram showing a display example of a content list created on the input/output panel 110 according to the first embodiment of the present invention. This display example represents an example of a content list created displayed when the By Title 531 and the Thumbnail 542 are selected on the option screen 520 shown in FIG. 13. This display example is the same as the example shown in FIG. 6, except that thumbnails are displayed in addition to the titles and names of authors of individual book contents, and that 9 items are included per page. Accordingly, the common parts are denoted by the same reference numerals and detailed description thereof is omitted.

A content list screen a 640. In the display example shown in FIG. 15, a content list corresponding to the first page of the content list held in the content list holding unit 230 is displayed. 630 shown in FIG. 15 includes a content list display are In the content list display area 640, thumbnails, titles, and author names corresponding to individual items are displayed while being ordered in a 3×3 matrix arrangement. Since items contained in the content list are of substantially the same kind, in this example, only items placed at the beginning of the content list display area 620 are denoted by reference numerals and described, and description of common parts of the other items is omitted.

In the content list display area 640, a thumbnail 641 representing each content, a title 642 of each content, and a related person's name 643 are displayed. The title 642 and the related person's name 643 are the same as those in the example shown in FIG. 6 or the like. The thumbnail 641 is a thumbnail stored in the content management information storing unit 300. It should be noted that a thumbnail can be held in the content list holding unit 230 shown in FIG. 5, and information on this held thumbnail can be displayed.

A date icon 644 indicating the expiry date for each book content is displayed in a lower part of each thumbnail. For example, if letters "Today" are included in the date icon 644, this indicates that the rental expiry date for the displayed content is today. A memory icon 645, which indicates a recording medium on which each book content is stored, is displayed in an upper right portion of each thumbnail. For example, the memory icon 645 is not displayed in the case of book content stored in the recording unit 140 built in the information processing apparatus 100. In the case of book content stored on a recording medium connected to the recording medium slot 150, for example, letters such as "MD" or "SD" are displayed in the memory icon 645 in accordance with the recording medium. If, for example, a thumbnail is not stored in association with a book content corresponding to each item displayed in the content list display area 640, a thumbnail (default thumbnail) 646 indicating book content is displayed.

FIG. 16 is a diagram showing a display example of a content list created on the input/output panel 110 according to the first embodiment of the present invention. This display example represents an example of a content list created displayed when the collection selecting area 504 is selected on the home screen 500 shown in FIG. 9. In this example, on the basis of collection information stored in the Collection Information 307 shown in FIG. 4, the titles of individual collections are ordered in dictionary order to create a content list of connections. Other than that a content list is created in this way, this example is the same as the example shown in FIG. 6. Accordingly, in the following, the common parts are denoted by the same reference numerals and detailed description thereof is omitted.

A content list screen 650 shown in FIG. 16 includes a list information display area 660 and a content list display area 670. It should be noted that in the display example shown in FIG. 16, a content list corresponding to the first page of a content list held in the content list holding unit 230 is displayed.

The list information display area 660 is substantially the same as the list information display area 410 shown in FIG. 9, the difference being that the ordering rule 413 in the list information display area 410 is not displayed. In this example, collections are ordered in dictionary order by using only the titles of collections created by a user's operation, so the ordering rule 413 is not displayed. In addition, the list information display area 660 differs from the list information display area 410 shown in FIG. 6 in that "Collections" is displayed as the content kind 411, and an icon indicating collections is displayed as the icon 412.

The content list display area 670 is substantially the same as the content list display area 420 shown in FIG. 6. That is, as the title 421 in the content list display area 420, a title 671 of each collection is displayed, and as the icon 422, an icon 672 indicating each collection is displayed. In addition, the content list display area 670 differs from the content list display area 420 shown in FIG. 6 in that instead of the related person's name 423, the number of book contents belonging to each collection 673 is displayed.

FIG. 17 is a diagram showing a display example of a content list created on the input/output panel 110 according to the first embodiment of the present invention. This display example represents an example of a content list created displayed when any one of items is selected on the content list screen 650 shown in FIG. 16. In this example, on the basis of collection information stored in the Collection Information 307 shown in FIG. 4, the titles of individual contents belonging to a selected collection are ordered in dictionary order to create a content list. Other than that a content list is created in this way, this example is the same as the example shown in FIG. 6. Accordingly, in the following, the common parts are denoted by the same reference numerals and detailed description thereof is omitted. It should be noted that the contents of individual items are illustrated as being the same as those shown in FIG. 12.

A content list screen 680 shown in FIG. 17 includes a list information display area 681 and a content list display area 682. The list information display area 681 is substantially the same as the list information display area 410 shown in FIG. 6. The difference is that, for example, in the list information display area 681, "Collection Contents" is displayed as the content kind 411, and an icon indicating collections is displayed as the icon 412. The content list display area 682 is substantially the same as the content list display area 420 shown in FIG. 6, and differs from the content list display area 420 in that only items corresponding to individual contents belonging to a selected collection are displayed.

While the above-described example is directed to the case in which a content list is created and displayed for each content kind, an embodiment of the present invention is also applicable to a case in which, for example, a content list for a plurality of kinds of content is created and displayed. For example, an embodiment of the present invention is also applicable to a case in which a single content list related to book content, music content, and image content is created and displayed.

[Display Example of Content List Based on Another Rule]

The foregoing description is directed to the case of displaying a content list ordered in dictionary order. In the following, a description will be given of the case of displaying a content list created on the basis of an ordering rule other than the dictionary order.

Figure 18:
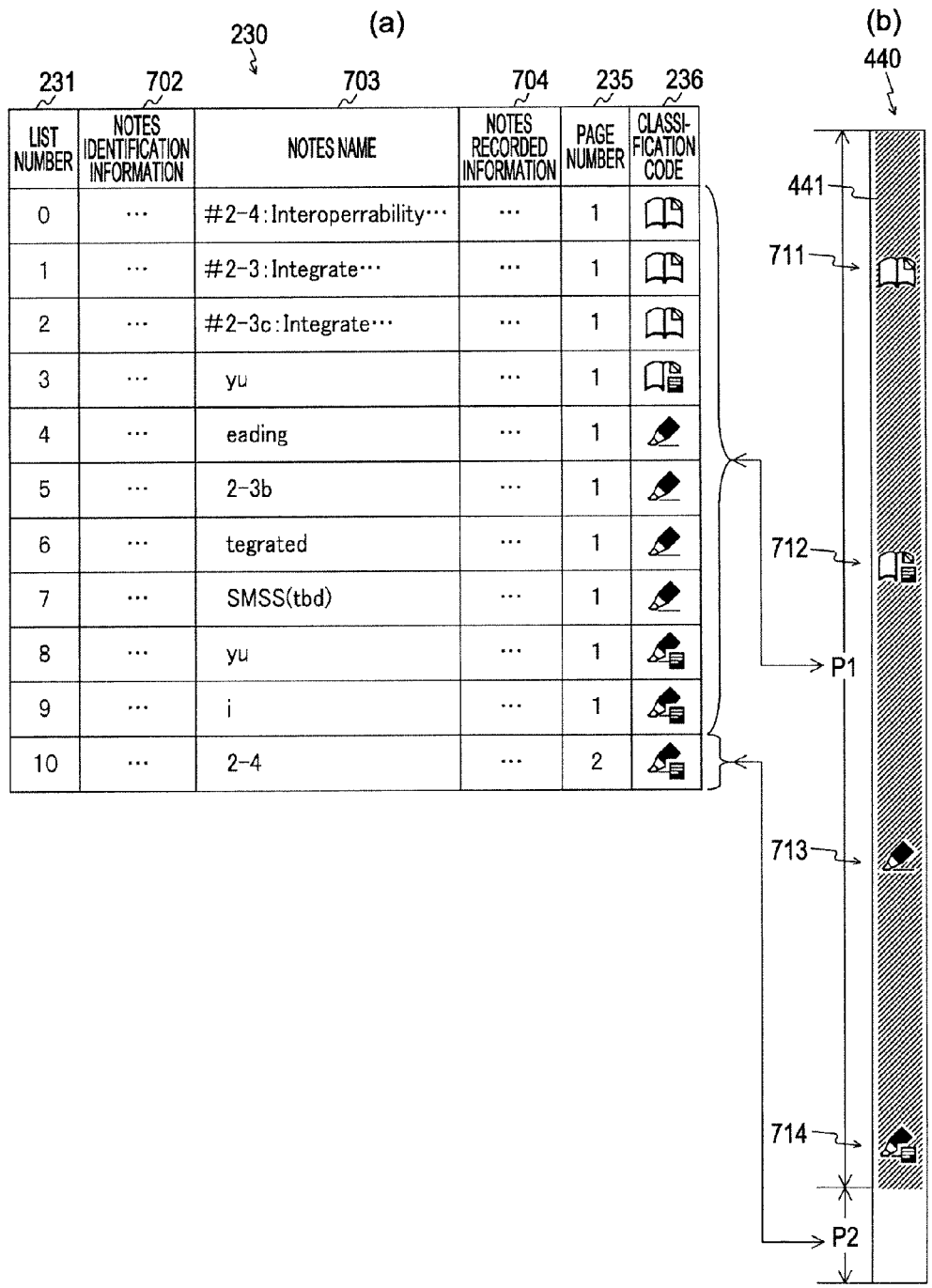
FIG. 18 is a diagram schematically showing the relationship between a content list held in the content list holding unit, and the classification-sign-display-bar display area according to the first embodiment of the present invention.

FIG. 18 is a diagram schematically showing the relationship between a content list held in the content list holding unit 230, and the classification-sign-display-bar display area 440 according to the first embodiment of the present invention. FIG. 18(*a*) schematically shows a content list created by the content list creating unit 220 and held in the content list holding unit 230. This content list represents an example of content list displayed when the notes selecting area 503 is selected on the home screen 500 shown in FIG. 9. In this example, on the basis of notes information stored in the Notes Information 306 shown in FIG. 4, the notes names of notes on all book contents are ordered in dictionary order to create a content list. This notes information contains, for example, Bookmarks and Highlights. As annotations added to the Bookmarks and the Highlights, the notes information includes, for example, Bookmark with comment and Highlight with comment.

The Bookmark is a bookmark that can be added to each page of the text of book content by a user's operation. On a bookmarked page, an icon (Dog-ear) is displayed in the upper right of the text of the display screen. As a classification sign indicating this Bookmark, a classification sign 711 shown in FIG. 18(*b*) is used.

The Bookmark with comment is an annotation arbitrarily added to a Bookmark by a user's operation. For example, by performing a tap operation on a Bookmark in the text, the details of comment on the Bookmark can be checked. As a classification sign indicating this Bookmark with comment, a classification sign 712 shown in FIG. 18(*b*) is used.

The Highlight is a feature of marking an arbitrary word (paragraph) in the text of book content in the manner of a highlighter pen to emphasize that portion. As a classification sign indicating this Highlight, a classification sign 713 shown in FIG. 18(*b*) is used.

The Highlight with comment is an annotation arbitrarily added to a Highlight by a user's operation. For example, by performing a tap operation on a Highlight in the text, the details of comment on the Highlight can be checked. As a classification sign indicating this Highlight with comment, a classification sign 714 shown in FIG. 18(*b*) is used.

It is assumed here that a Bookmark is used by the user more frequency as a basic feature than a Highlight. Also, it is assumed that a Bookmark is used by the user more frequency than a Bookmark with comment, and that a Highlight is used by the user more frequency than a Highlight with comment. Accordingly, in this example, a description will be given of the case of using an ordering rule for ordering pieces of notes information in the order of frequency of use by the user.

The content list holding unit 230 shown in FIG. 18(*a*) holds Notes Identification Information 702, Notes Name 703, and Notes Recorded Information 704, instead of the Content Identification Information 232, the Title 233, and the Related Person's Name 234. Another difference from the example shown in FIG. 5 is that as the Classification Code 236, classification signs corresponding to individual pieces of notes information are held instead of "#", "A" to "Z", and "*".

In the Notes Identification Information 702, identification information for identifying each piece of notes information is stored. In the Notes Name 703, letters indicating a notes name given to each piece of notes information is stored. In the Notes Recorded Information 704, appended information such as letters indicating the title or page of each book associated with each piece of notes information is stored. In the example shown in FIG. 18(*b*), information in the Notes Identification Information 702 and the Notes Recorded Information 704 is omitted.

As for the ordering within each piece of notes information (ordering for each classification sign), for example, an ordering is done on a time series basis, with the date and time of creation of each piece of notes information as a reference.

FIG. 18(*b*) shows an example of display in the classification-sign-display-bar display area 440. It should be noted that the relationship shown in FIG. 18 is the same as that in the example shown in FIG. 10, except that the contents and classification signs of individual items differ. Accordingly, a detailed description thereof is omitted here.

Figure 19:
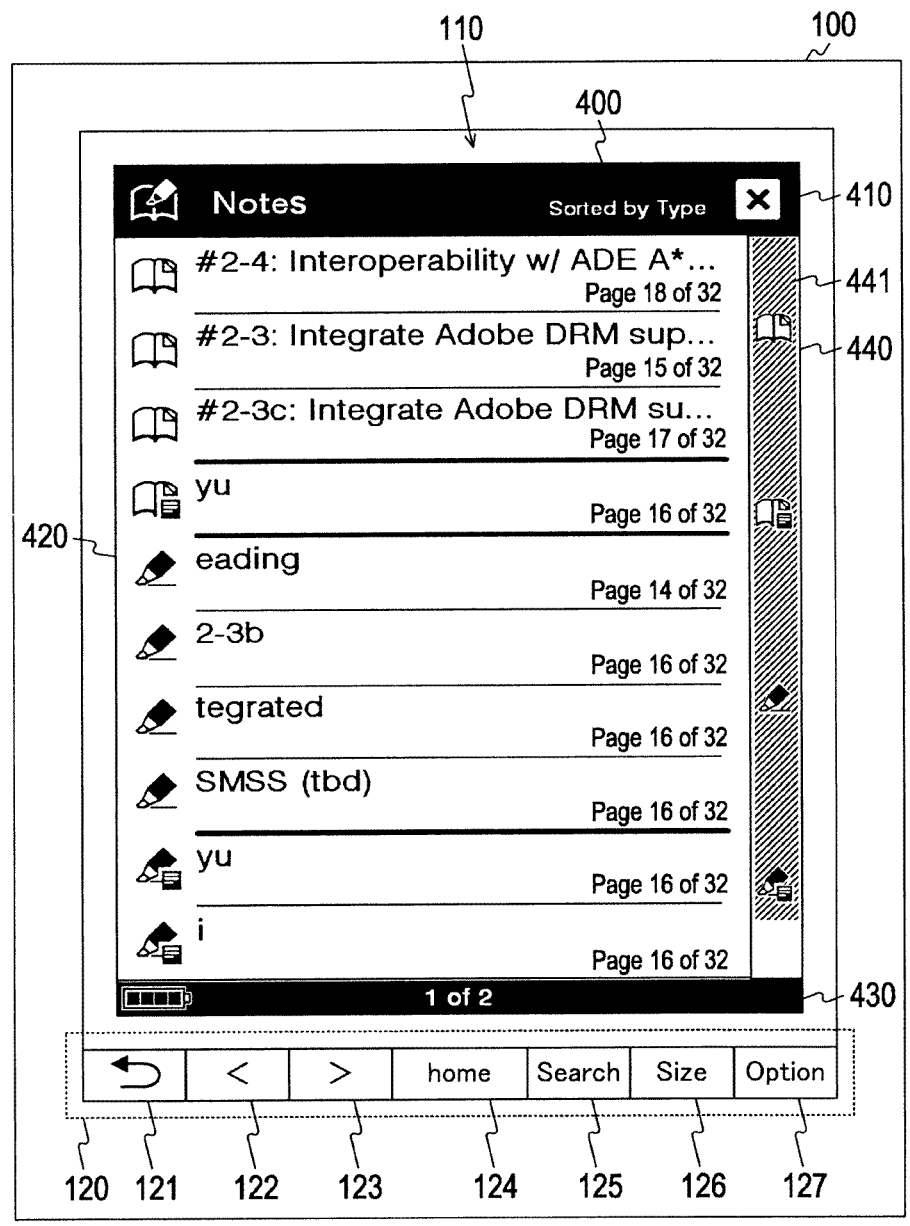
FIG. 19 is a diagram showing a display example of a content list screen on the input/output panel according to the first embodiment of the present invention.

FIG. 19 is a diagram showing a display example of a content list screen on the input/output panel 110 according to the first embodiment of the present invention. This display example represents an example of a content list created on the basis of notes information when the notes selecting area 503 is selected by the user on the home screen 500 shown in FIG. 9, and corresponds to the list screen 514 shown in FIG. 8. This display example is based on the relationship shown in FIG. 18, and is substantially the same as the above-described display example, except that the contents, classification signs, and the like of individual items differ. Accordingly, a detailed description thereof is omitted here.

In the case where, as described above, a content list created on the basis of an ordering rule other than the dictionary order is displayed as well, a classification sign display bar can be displayed in the same manner as when displaying a content list created in accordance with the dictionary order. In addition, the content list can be moved by a tap operation or a drag operation on this classification sign display bar.

[Operation Example of Information Processing Apparatus]

Figure 20:
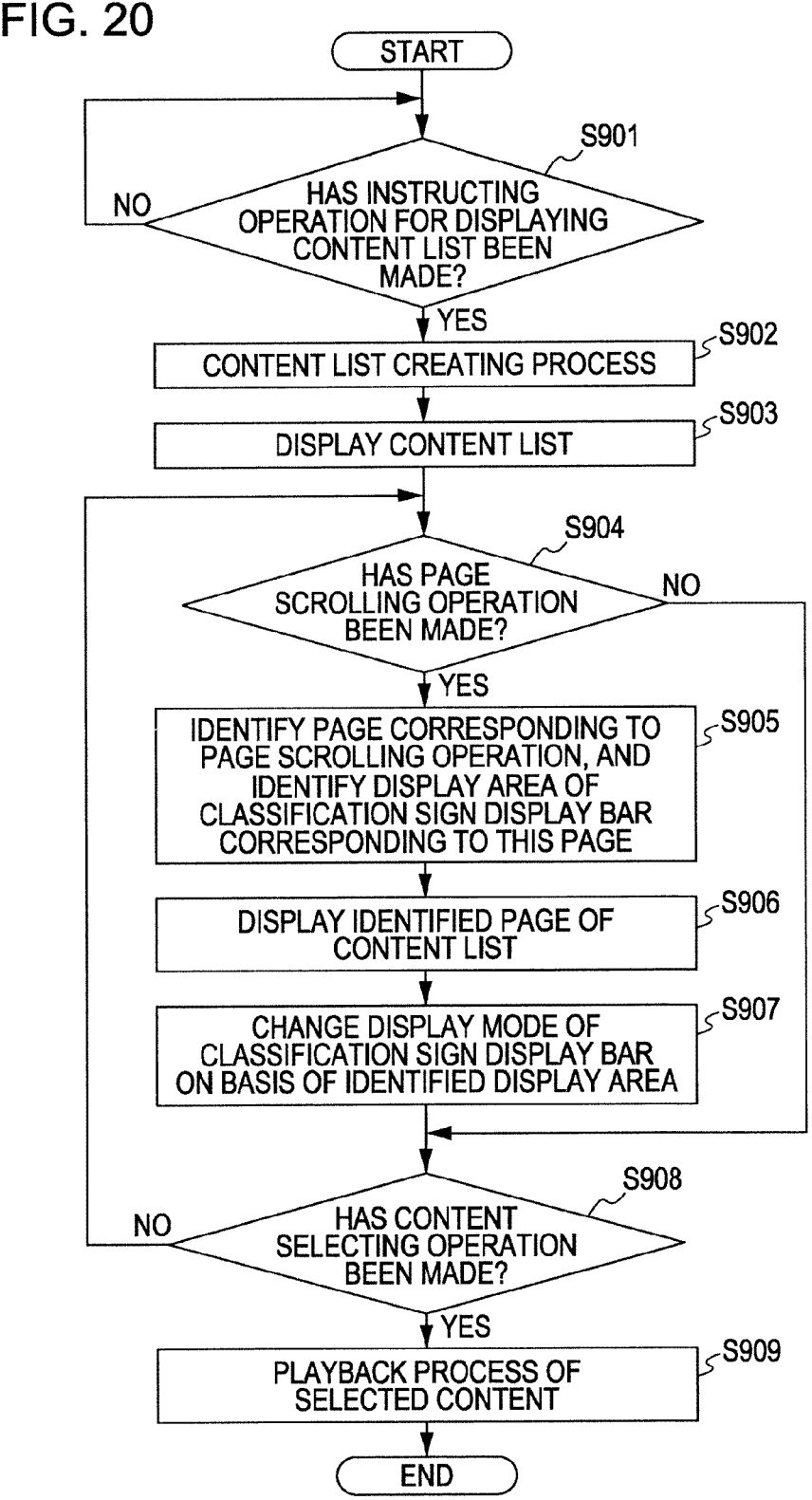
FIG. 20 is a flowchart showing the procedure of a content playback process with the information processing apparatus according to the first embodiment of the present invention.

FIG. 20 is a flowchart showing the procedure of a content playback process with the information processing apparatus 100 according to the first embodiment of the present invention.

First, it is determined whether or not an instructing operation for displaying a content list has been accepted by the operation accepting unit 210 (step S901). If an instructing operation for displaying a content list has not been accepted, monitoring is continued until such an instructing operation is accepted.

If an instructing operation for displaying a content list has been accepted (step S901), the content list creating unit 220 creates a content list in accordance with the instructing operation (step S902). The created content list is held in the content list holding unit 230. Subsequently, the display control unit 260 displays, on the display unit 270, the content list held in the content list holding unit 230 (step S903). For example, the first page of a plurality of pages is displayed. Also, a classification-sign-display-bar display area corresponding to the first page is displayed. It should be noted that step S903 is an example of each of a first display control step and a second display control step described in the claims.

Subsequently, it is determined whether or not a page scrolling operation has been accepted by the operation accepting unit 210 (step S904). As this page scrolling operation, for example, it is determined whether or not a depressing operation on the page scrolling button 122 or 123, or a tap operation or drag operation on the classification-sign-display-bar display area 440 has been made. If a page scrolling operation has not been accepted (S904), the process proceeds to step S908. If a page scrolling operation has been accepted (step S904), the classification-sign-display-bar controlling unit 240 identifies a page corresponding to the page scrolling operation, and identifies the display area of the current-display-page indicator bar 441 corresponding to the identified page (step S905).

Subsequently, the display control unit 260 displays, on the display unit 270, the identified page of the content list held in the content list holding unit 230 (step S906). Subsequently, the display control unit 260 changes the display mode in the classification-sign-display-bar display area 440 on the basis of the identified display area (step S907). That is, the current-display-page indicator bar is moved. It should be noted that step S906 is an example of a first display control step described in the claims. In addition, step S907 is an example of a second display control step described in the claims.

Subsequently, it is determined whether or not a selecting operation of selecting a content has been accepted by the operation accepting unit 210 (step S908). If a selecting operation of selecting content has not been accepted (step S908), the process returns to step S904. On the other hand, if a selecting operation of selecting content has been accepted (step S908), a playback process of the selected content is performed (step S909). That is, the content acquiring unit 250 acquires the selected content from the content storing unit 200, and the display control unit 260 displays the acquired content on the display unit 270.

2. Second Embodiment

The above-described first embodiment of the present invention is directed to the case in which, when displaying a content list, the content list is changed and displayed on a preset page-by-page basis. By displaying a content list on a preset page-by-page basis in this way, page scrolling can be performed in the manner of turning book's pages, allowing for easy viewing. However, for example, it is also assumed that some users like to view a content list while moving forward through items on a line-by-line basis. Accordingly, a second embodiment of the present invention is directed to a case in which, when displaying a content list, the content list is displayed while being moved on a line-by-line basis. It should be noted that since a functional configuration according to the second embodiment of the present invention is substantially the same as that of the information processing apparatus 100 according to the first embodiment of the present invention, the following description will focus on differences from the first embodiment of the present invention.

[Display Examples of Screens]

Figure 21:
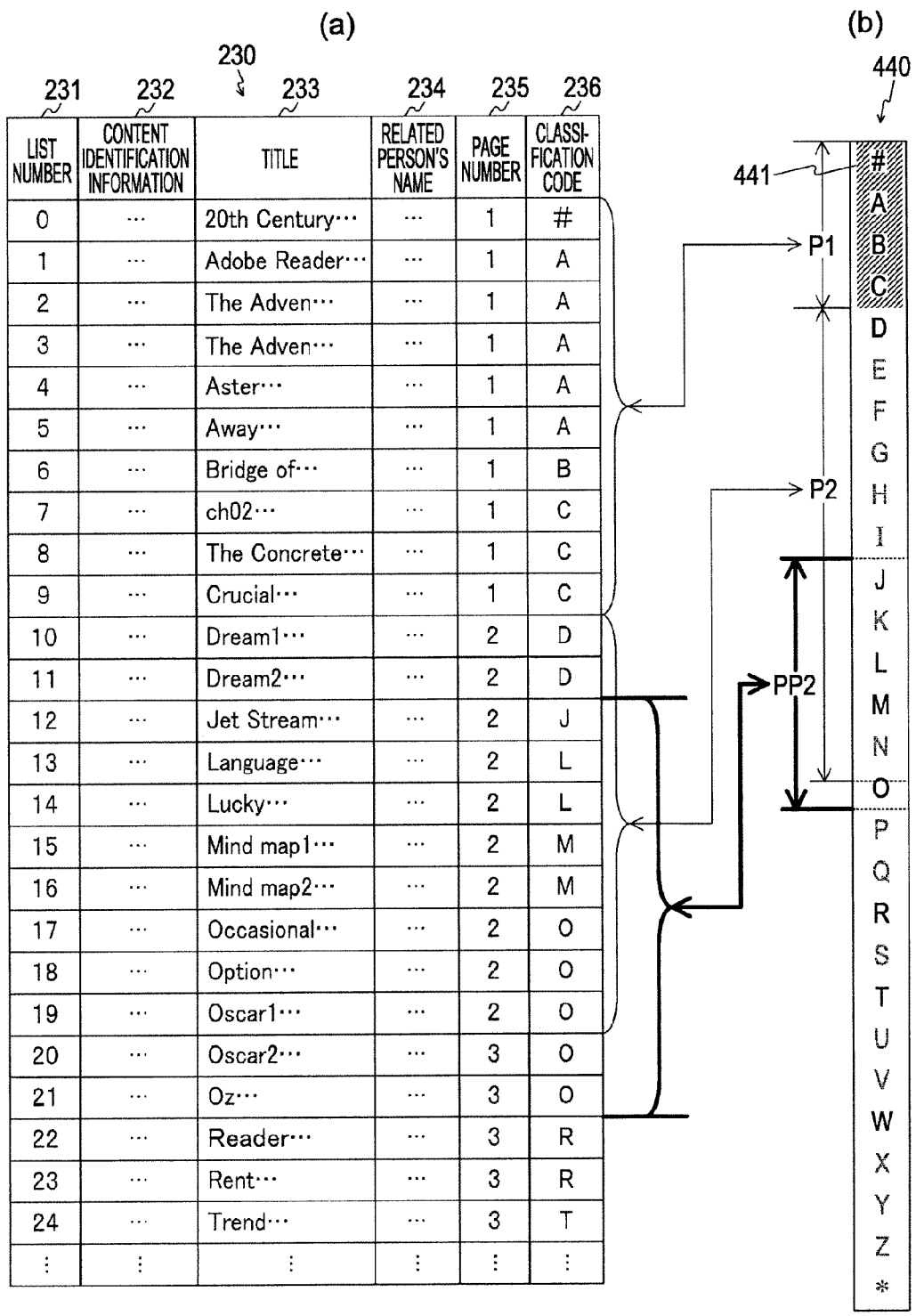
FIG. 21 is a diagram schematically showing the relationship between a content list held in the content list holding unit, and the classification-sign-display-bar display area according to a second embodiment of the present invention.

FIG. 21 is a diagram schematically showing the relationship between a content list held in the content list holding unit 230, and the classification-sign-display-bar display area 440 according to the second embodiment of the present invention. It should be noted that the relationship between the two is the same as that of the example shown in FIG. 10, except that the contents differ. Accordingly, in the following, the common parts are denoted by the same reference numerals and detailed description thereof is omitted.

In this case, when, for example, a depressing operation on the page scrolling button 122 or 123 is made, individual items of the content list are changed on a page-by-page basis in the same manner as in the first embodiment of the present invention. However, in the second embodiment of the present invention, when a tap operation or a drag operation is made on the classification-sign-display-bar display area 440, in accordance with the operation, individual items of the content list are changed on a line-by-line basis. This tap operation or drag operation will be described later in detail with reference to FIGS. 22 to 24.

Figure 22:
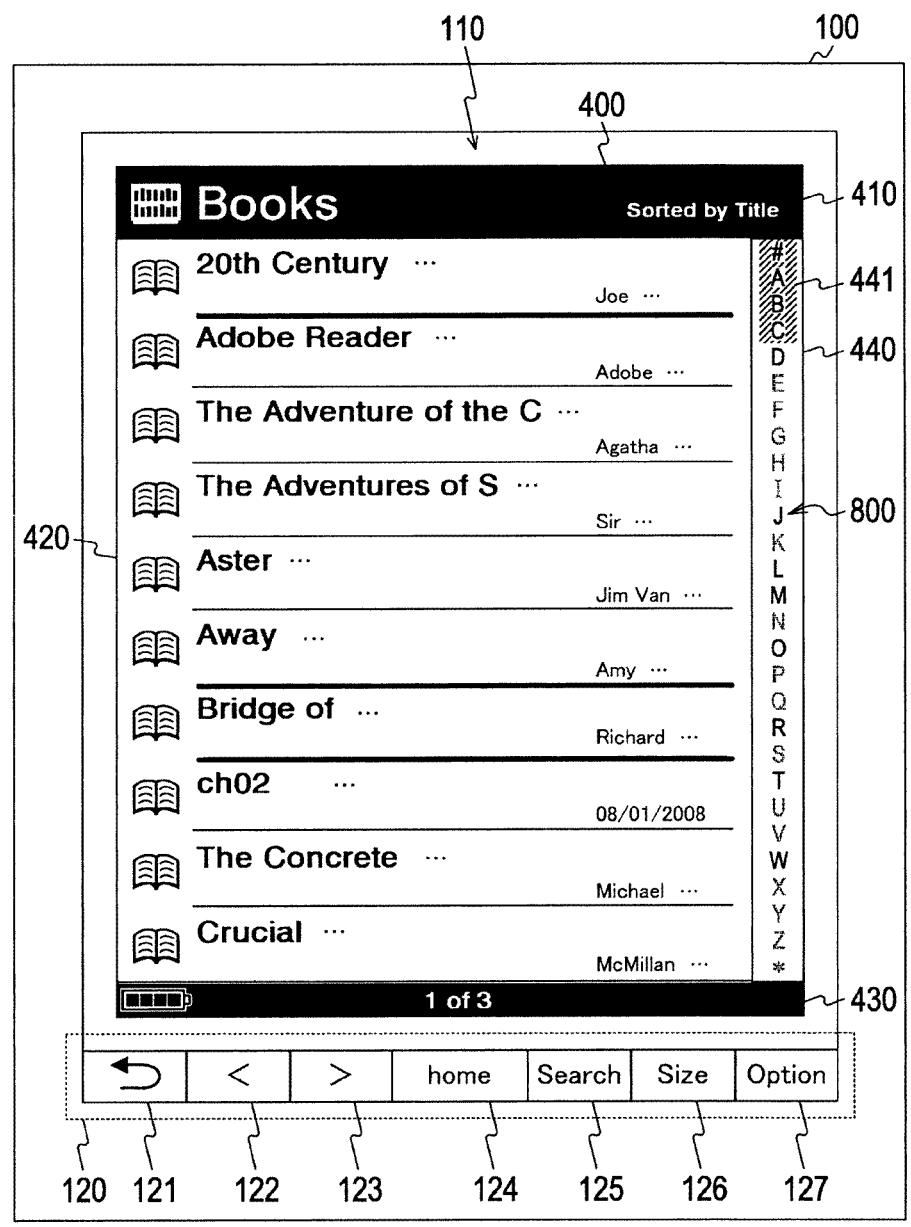
FIG. 22 is a diagram showing a display example of a content list screen on the input/output panel according to the second embodiment of the present invention.
Figure 23:
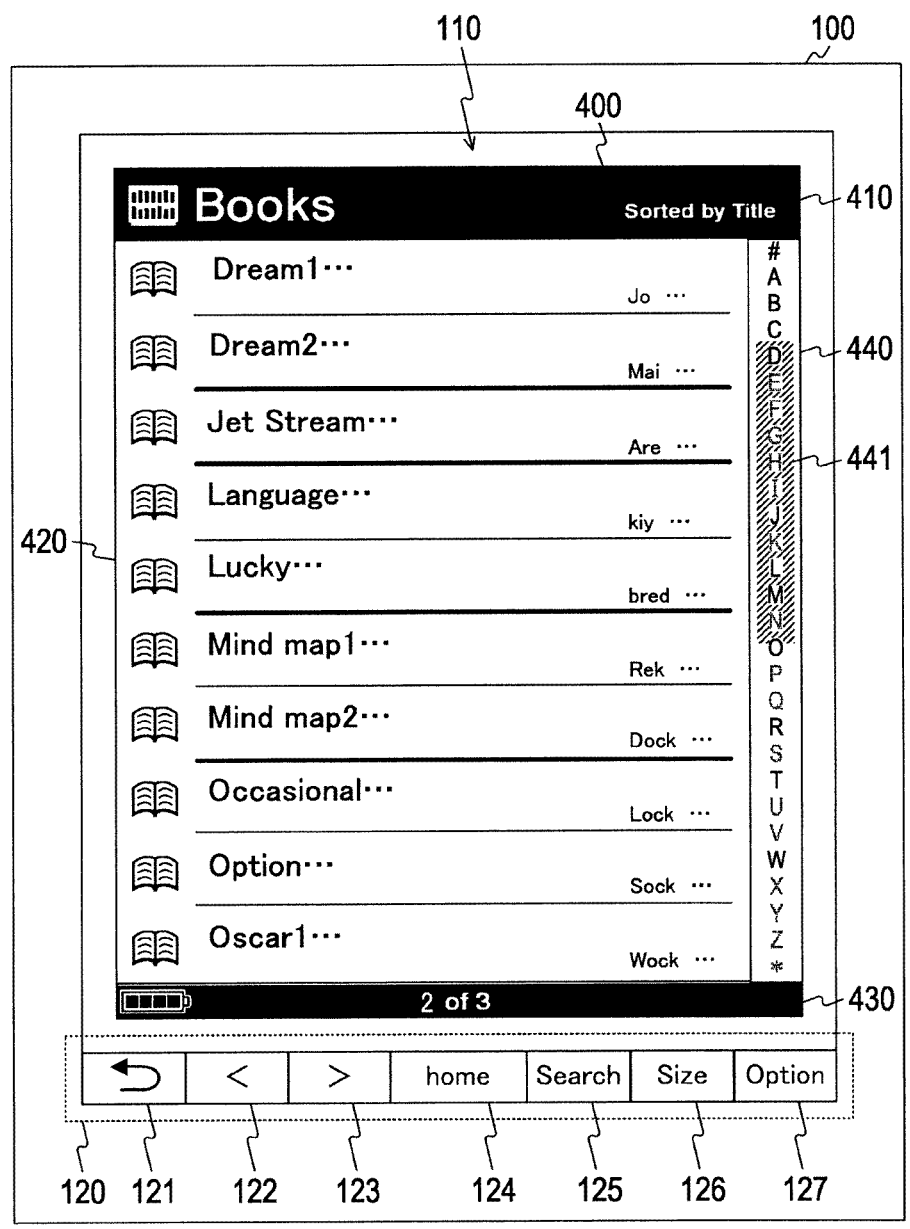
FIG. 23 is a diagram showing a display example of a content list screen on the input/output panel according to the second embodiment of the present invention.
Figure 24:
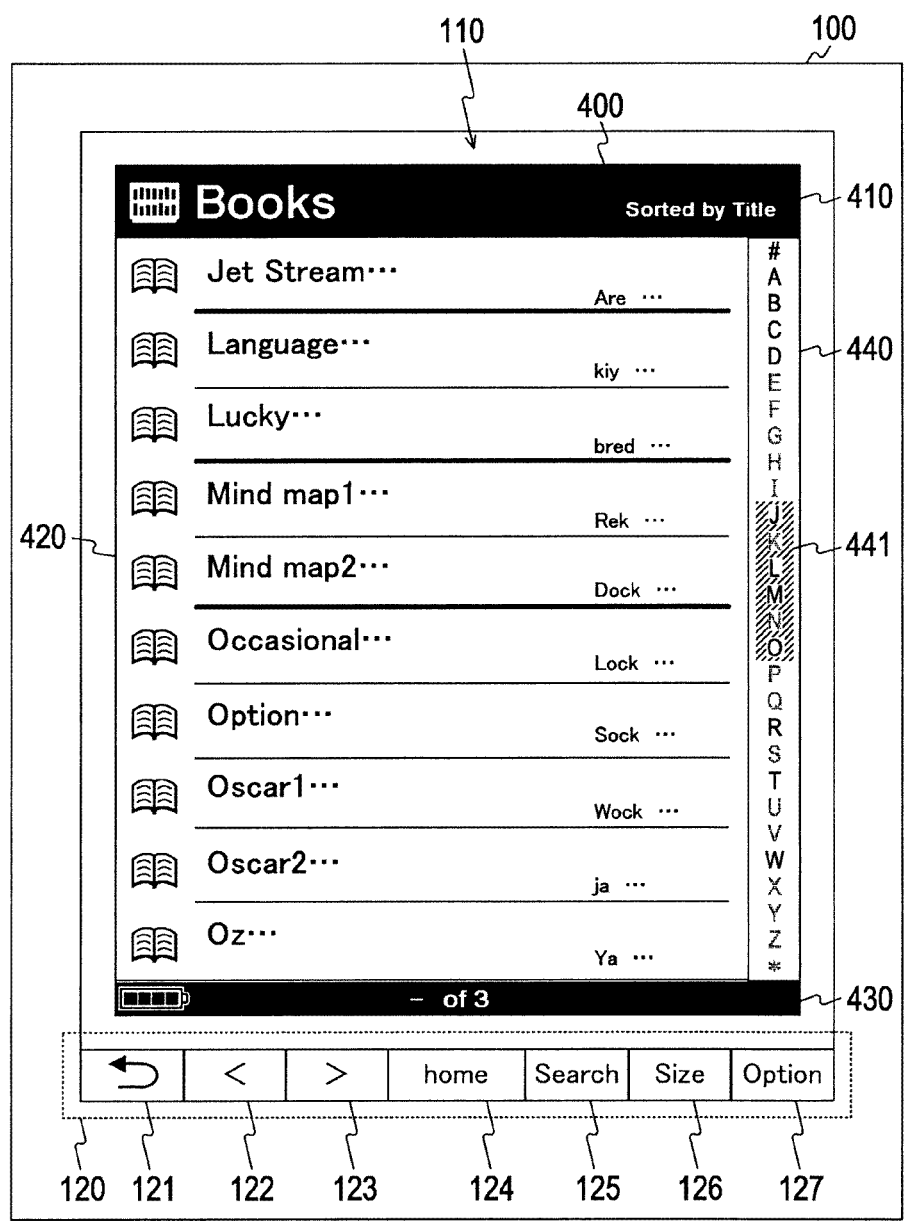
FIG. 24 is a diagram showing a display example of a content list screen on the input/output panel according to the second embodiment of the present invention.

FIGS. 22 to 24 are diagrams showing display examples of content list screen on the input/output panel 110 according to the second embodiment of the present invention. These display examples are the same as the example shown in FIG. 11 and the like, except that the contents differ. Accordingly, the common parts are denoted by the same reference numerals and detailed description thereof is omitted. In this case, for example, when a depressing operation on the page scrolling button 123 is made while the content list shown in FIG. 22 is displayed, as shown in FIG. 23, the second page of the content list is displayed. That is, a content list corresponding to the second page of the content list held in the content list holding unit 230 shown in FIG. 21(a) is displayed.

On the other hand, for example, suppose a case in which, while the content list shown in FIG. 22 is displayed, a tap operation on the classification sign "J" (indicated by an arrow 800) has been made on the classification-sign-display-bar display area 440. In this case, a content list beginning with a letter "J" is displayed as shown in FIG. 24. That is, as shown in FIG. 21(a), a content list (items corresponding to PP2) beginning with an item corresponding to the Classification Code 236 "J" is displayed. In this case, the classification-sign-display-bar controlling unit 240 identifies an item corresponding to the tap operation, and identifies a display area of the current-display-page-indicator bar corresponding to the identified item. Then, the display control unit 260 displays, on the display unit 270, a content list beginning with the identified item, and on the basis of the identified display area of the current-display-page-indicator bar, the display mode in the classification-sign-display-bar display area 440 is changed.

When a drag operation is performed, in accordance with the amount of movement by the drag operation, the classification-sign-display-bar controlling unit 240 identifies an item corresponding to the drag operation, and identifies a display area of the current-display-page-indicator bar corresponding to the identified item. Then, the display control unit 260 displays a content list containing the identified item on the display unit 270, and on the basis of the identified display area of the current-display-page-indicator bar, the display mode in the classification-sign-display-bar display area 440 is changed.

In this way, a content list can be changed and displayed on a line-by-line basis by a tap operation or a drag operation in the classification-sign-display-bar display area 440, thereby making it possible to perform an appropriate scroll operation according to the user's preference. In this case, the current-display-page-indicator bar in the classification-sign-display-bar display area 440 moves in accordance with items contained in the content list that is changed on a line-by-line basis, thereby making it possible to intuitively grasp the range of items displayed in the classification-sign-display-bar display area 440. That is, when a part of a content list is displayed, the outline of items included in the current display screen within the entire content list can be easily grasped.

[Operation Example of Information Processing Apparatus]

FIG. 25 is a flowchart showing the procedure of a content playback process with the information processing apparatus 100 according to the second embodiment of the present invention. This example is a modification of the content playback process shown in FIG. 20. In this example, individual items are moved in accordance with an operation of changing items contained in a content list. Thus, portions that are the same as those of the procedure shown in FIG. 20 are denoted by the same reference numerals and description thereof is omitted.

It is determined whether or not a page scrolling operation has been accepted by the operation accepting unit 210 (step S904). If a page scrolling operation has not been accepted, it is determined whether or not a tap operation or a drag operation has been accepted by the operation accepting unit 210 (step S911). If a tap operation or a drag operation has not been accepted (step S911), the process proceeds to step S908.

If a tap operation or a drag operation has been accepted (step S911), the classification-sign-display-bar control unit 240 identifies an item corresponding to the tap operation or the drag operation. Then, the classification-sign-display-bar control unit 240 identifies a display area of the current-display-page-indicator bar corresponding to a page containing the identified item (step S912).

The above description is directed to the case in which item scrolling is changed in accordance with a tap operation or a drag operation on a classification sign in the classification-sign-display-bar display area 440. However, for example, it is possible to change item scrolling in accordance with a long-press operation or a short-press operation on a classification sign in the classification-sign-display-bar display area 440. Here, the long-press operation refers to an operation of depressing the touch panel 112 for a relatively long period of time, and the short-press operation refers to an operation of depressing the touch panel 112 for a relatively short period of time. For example, when a long-press operation on a classification sign has been made on the classification-sign-display-bar display area 440, a page containing items corresponding to the classification sign is displayed in the content list display area 420. That is, a content list is changed on a line-by-line basis. On the other hand, when a short-press operation on a classification sign has been made on the classification-sign-display-bar display area 440, a page containing items corresponding to the classification sign is displayed in the content list display area 420. That is, a content list is changed on a page-by-page basis. Also, when a long-press operation on a classification sign has been made on the classification-sign-display-bar display area 440, items may be narrowed down only to items corresponding to the classification sign and displayed in the content list display area 420. On the other hand, when a short-press operation on a classification sign has been made on the classification-sign-display-bar display area 440, a page containing items corresponding to the classification sign may be displayed in the content list display area 420. In this case, for example, the content list is changed on a line-by-line basis or on a page-by-page basis.

While each of the above embodiments of the present invention is directed to the case of an information processing apparatus such as a portable electronic book reader, for example, an embodiment of the present invention is applicable to an information processing apparatus such as a portable media player that can play back content such as music, moving images, or still images. Moreover, an embodiment of the present invention is applicable to an information processing apparatus such as a digital still camera or a digital video camera (for example, a camera-integrated recorder) which captures a subject to generate image data, and records this image data as content.

The above embodiments of the present invention are illustrative of one example for implementing the present invention, and as clearly indicated in the embodiments of the present invention, the features disclosed in the embodiments of the present invention and the specific features of the invention disclosed in the claims correspond to each other. Likewise, the specific features of the invention disclosed in the claims, and the features disclosed in the embodiments of the present invention which are given the same names as those given to the specific features of the invention correspond to each other. It should be noted, however, that the present invention is not limited to the above embodiments, and can be implemented with various modifications to the embodiments without departing from the scope of the present invention.

The process steps described in the above embodiments of the present invention may be grasped as a method having a series of these steps, or may be grasped as a program for causing a computer to execute a series of these steps or a recording medium storing the program. As this recording medium, there may be used, for example, a CD (Compact Disc), an MD (MiniDisc), a DVD (Digital Versatile Disk), a memory card, a Blu-ray Disc®, or the like.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus comprising:
circuitry configured to
accept an instructing operation to display a list including a plurality of items classified and ordered into classifications on the basis of a predetermined rule, cause a display to display a part of the list in accordance with the accepted instructing operation, and cause the display to display a classification sign display bar including classification signs representing the predetermined rule for each of the classifications ordered on the basis of the predetermined rule, wherein the circuitry controls a display state of the classification sign display bar so that an area including classification signs corresponding to items of the plurality of items which are contained in the list displayed on the display is displayed in a mode different from a display mode of an area including classification signs other than the classification signs, and causes the display to display the predetermined rule in an uppermost area of the display and separate from the part of the list and the classification sign display bar, the predetermined rule comprises sorting according to notes information added by a user to the items such that the items are not sorted in dictionary order, the notes information being assigned to and stored for each of the plurality of items individually and comprising bookmarks, highlights, and comments arbitrarily added by the user with regard to said each of the items, the notes information being of a plurality of types, the classification signs comprise graphical representations of the types of the notes information, and the circuitry is configured to store a table listing the items and, for each of the items, one of the classification signs associated with said each of the items.

2. The information processing apparatus according to claim 1, wherein:

if a classification sign corresponding to items contained in the list displayed on the display, and a classification sign corresponding to items contained in a part of the list, that is not displayed on the display circuit are the same classification sign, the circuitry changes a display mode related to an area containing the same classification sign, on the basis of a ratio between items related to the same classification sign which are displayed on the display, and items related to the same classification sign which are not displayed on the display.

3. The information processing apparatus according to claim 1, wherein:

the circuitry controls a display state of the classification sign display bar so that a rectangular area including classification signs corresponding to items contained in the list displayed on the display, and the other area are displayed in different modes on the classification sign display bar.

4. The information processing apparatus according to claim 1, wherein:

the circuitry controls a display state of the classification sign display bar so that an area including two classification signs corresponding to an item located at one end of and an item located at the other end of items contained in the list displayed on the display, and classification signs existing between the two classification signs is displayed in the same mode.

5. The information processing apparatus according to claim 1, wherein:

the circuitry controls a display state of the classification sign display bar so that classification signs corresponding to items contained in the list and classification signs corresponding to items not contained in the list are displayed in different modes.

6. The information processing apparatus according to claim 1, wherein:

the circuitry accepts a change operation of changing items contained in the list displayed on the display, when a part of the list and the classification sign display bar are displayed on the display; and the circuitry changes and displays items contained in the list displayed on the display, in accordance with the accepted change operation, and controls a display state of the classification sign display bar so that an area including classification signs corresponding to items contained in the list displayed on the display after the change, and an area including classification signs other than the classification signs are displayed in different modes.

7. The information processing apparatus according to claim 6, wherein:

the circuitry arranges and orders the classification signs on the classification sign display bar in a same direction as a direction of movement of items contained in the list which are changed in accordance with the accepted change operation.

8. The information processing apparatus according to claim 6, wherein:

the circuitry accepts, as the change operation, an operation of changing items contained in the list on a page-by-page basis; and the circuitry changes and displays items contained in the list displayed on the display, on a page-by-page basis in accordance with the accepted change operation.

9. The information processing apparatus according to claim 6, wherein:

the circuitry accepts, as the change operation, an operation of changing items contained in the list on an item-by-item basis; and the circuitry changes and displays items contained in the list displayed on the display, on an item-by-item basis in accordance with the accepted change operation.

10. The information processing apparatus according to claim 6, wherein:

the circuitry accepts, as the change operation, an operation of changing a display mode on the classification sign display bar; and the circuitry causes the display to display a part of the list containing items corresponding to a classification sign identified in accordance with the accepted change operation.

11. The information processing apparatus according to claim 6, wherein:

the circuitry accepts, as the change operation, a selecting operation of selecting a desired classification sign on the classification sign display bar; and the circuitry causes the display to display a part of the list containing items corresponding to the selected classification sign.

12. The information processing apparatus according to claim 6, wherein:

the circuitry includes a touch panel that detects an object in proximity to or touching the classification sign display bar, and accepts an operation input based on the detected proximity or touching as the change operation; and the circuitry causes the display to display a part of the list containing items corresponding to a classification sign identified in accordance with the accepted change operation.

13. The information processing apparatus according to claim 1, wherein:

the circuitry causes the display to display the list containing the items each including at least one of a letter, a numeral, a symbol, and an image representing content, and accepts a selecting operation of selecting an item contained in the list displayed on the display; and the circuitry further plays back content corresponding to the item selected in accordance with the accepted selecting operation.

14. The information processing apparatus according to claim 1, wherein the circuitry accepts selection of the predetermined rule.

15. The information processing apparatus according to claim 1, wherein the types of the notes information comprise bookmarks, bookmarks with comments, highlights, and highlights with comments.

16. A display control method comprising:

causing a display circuit to display a part of a list including a plurality of items classified and ordered into classifications on the basis of a predetermined rule;

causing the display circuit to display a classification sign display bar including classification signs representing the predetermined rule for each of the classifications ordered on the basis of the predetermined rule;

controlling a display state of the classification sign display bar so that an area including classification signs corresponding to items of the plurality of items which are contained in the list displayed on the display circuit, and an area including classification signs other than the classification signs are displayed in different modes;

causing the display circuit to display the predetermined rule in an uppermost area of the display circuit and separate from the part of the list and the classification sign display bar, wherein the predetermined rule comprises sorting according to notes information added by a user to the items such that the items are not sorted in dictionary order, the notes information being assigned to and stored for each of the plurality of items individually and comprising bookmarks, highlights, and comments arbitrarily added by the user with regard to said each of the items, the notes information being of a plurality of types, the classification signs comprise graphical representations of the types of the notes information, and a table is stored listing the items and, for each of the items, one of the classification signs associated with said each of the items.

17. A non-transitory computer-readable medium storing computer-readable instructions that, when executed by a computer, cause the computer to perform a method comprising:

causing a display circuit to display a part of a list including a plurality of items classified and ordered into classifications on the basis of a predetermined rule;

causing a display circuit to display a classification sign display bar including classification signs representing the predetermined rule for each of the classifications are ordered on the basis of the predetermined rule;

controlling a display state of the classification sign display bar so that an area including classification signs corresponding to items of the plurality of items which are contained in the list displayed on the display circuit, and an area including classification signs other than the classification signs are displayed in different modes;

causing the display circuit to display the predetermined rule in an uppermost area of the display circuit and separate from the part of the list and the classification sign display bar, wherein the predetermined rule comprises sorting according to notes information added by a user to the items such that the items are not sorted in dictionary order, the notes information being assigned to and stored for each of the plurality of items individually and comprising bookmarks, highlights, and comments arbitrarily added by the user with regard to said each of the items, the notes information being of a plurality of types, the classification signs comprise graphical representations of the types of the notes information, and a table is stored listing the items and, for each of the items, one of the classification signs associated with said each of the items.

* * * * *